(12) United States Patent
Legrand

(10) Patent No.: US 12,378,681 B2
(45) Date of Patent: Aug. 5, 2025

(54) ELECTROCHEMICAL CELL FOR CARBON DIOXIDE REDUCTION TOWARDS LIQUID CHEMICALS

(71) Applicant: ÉLECTRO CARBONE INC., St-Mathieu-de-Beloeil (CA)

(72) Inventor: Ulrich Legrand, Longueuil (CA)

( * ) Notice: Subject to any disclaimer, the term of this patent is extended or adjusted under 35 U.S.C. 154(b) by 0 days.

(21) Appl. No.: 18/005,371

(22) PCT Filed: Jul. 28, 2021

(86) PCT No.: PCT/CA2021/051054
§ 371 (c)(1),
(2) Date: Jan. 13, 2023

(87) PCT Pub. No.: WO2022/020950
PCT Pub. Date: Feb. 3, 2022

(65) Prior Publication Data
US 2023/0279563 A1 Sep. 7, 2023

Related U.S. Application Data

(60) Provisional application No. 63/057,375, filed on Jul. 28, 2020.

(51) Int. Cl.
*C25B 3/26* (2021.01)
*C25B 3/07* (2021.01)
(Continued)

(52) U.S. Cl.
CPC .............. *C25B 3/26* (2021.01); *C25B 3/07* (2021.01); *C25B 9/19* (2021.01); *C25B 9/63* (2021.01); *C25B 9/77* (2021.01); *C25B 11/032* (2021.01)

(58) Field of Classification Search
CPC .... C25B 3/26; C25B 3/07; C25B 9/19; C25B 9/63; C25B 9/77; C25B 11/032
See application file for complete search history.

(56) References Cited

U.S. PATENT DOCUMENTS

| 4,722,773 A | * | 2/1988 | Plowman | .................. C25B 1/46 |
| | | | | 429/444 |
| 5,693,202 A | | 12/1997 | Gestermann et al. | |

(Continued)

FOREIGN PATENT DOCUMENTS

| CA | 3038340 A1 | 4/2018 |
| CA | 3088833 A1 | 10/2019 |

(Continued)

OTHER PUBLICATIONS

International application No. PCT/CA2021/051054 International Search Report dated Nov. 22, 2021.

(Continued)

*Primary Examiner* — Ciel P Contreras
(74) *Attorney, Agent, or Firm* — Anglehart et al.

(57) ABSTRACT

An electrochemical cell configured for reducing carbon dioxide; it has an anode electrode; a cathode electrode comprising a porous support including metal acting as a catalyst; an anion exchange membrane, wherein the anion exchange membrane separates an anodic compartment from a cathodic compartment; the anolyte and the catholyte are composed of a liquid electrolyte solution with a concentration between 0.1M-10M, wherein anions of the electrolyte solution is adapted to diffuse from the cathodic compartment to the anodic compartment through the anion exchange membrane, wherein the carbon dioxide contacts the cathode electrode and the catalyst converts electrochemically the carbon dioxide into C1-C2 liquid organic biproducts and anions as at the catholyte; wherein the cathode electrode and the anode electrode are electrically connected through one of current collector plates; and a wired connection.

18 Claims, 34 Drawing Sheets

(51) Int. Cl.
*C25B 9/19* (2021.01)
*C25B 9/63* (2021.01)
*C25B 9/77* (2021.01)
*C25B 11/032* (2021.01)

(56) References Cited

U.S. PATENT DOCUMENTS

| | | | |
|---|---|---|---|
| 8,641,885 B2 | 2/2014 | Sivasankar et al. | |
| 8,845,875 B2 | 9/2014 | Teamey et al. | |
| 2013/0134049 A1* | 5/2013 | Teamey | C07C 1/26 205/349 |
| 2016/0222528 A1 | 8/2016 | Bedell et al. | |
| 2016/0355931 A1* | 12/2016 | Kaczur | C07C 29/149 |
| 2017/0314148 A1* | 11/2017 | Rondinone | C25B 11/051 |
| 2018/0023203 A1* | 1/2018 | Hernández Alonso | C25B 1/00 204/157.15 |
| 2018/0209051 A1 | 7/2018 | Baker et al. | |
| 2018/0265440 A1 | 9/2018 | Kudo et al. | |
| 2019/0010620 A1 | 1/2019 | Kaczur et al. | |
| 2020/0002829 A1* | 1/2020 | Kudo | C25B 3/25 |
| 2020/0378015 A1* | 12/2020 | Hanebuth | C25B 15/087 |
| 2021/0218036 A1* | 7/2021 | Sargent | C25B 11/031 |
| 2021/0292925 A1* | 9/2021 | Mikoshiba | C25B 1/04 |
| 2021/0348286 A1* | 11/2021 | Bulan | C25B 9/75 |

FOREIGN PATENT DOCUMENTS

| | | |
|---|---|---|
| CA | 3125442 A1 | 7/2020 |
| WO | 95/02716 A1 | 1/1995 |
| WO | 2014/043651 A2 | 3/2014 |
| WO | 2019/185622 A1 | 10/2019 |

OTHER PUBLICATIONS

International application No. PCT/CA2021/051054 Search Strategy dated Nov. 22, 2021.
International application No. PCT/CA2021/051054 Written Opinion of the International Searching Authority dated Nov. 22, 2021.
G. P. Smestad and A. Steinfeld, "Review: Photochemical and thermochemical production of solar fuels from H 2O and CO 2 using metal oxide catalysts," Ind. Eng. Chem. Res., vol. 51, No. 37, pp. 11828-11840, 2012, doi: 10.1021/ie3007962.
B. Fidalgo and J. Á. Menendez, "Carbon materials as catalysts for decomposition and CO2reforming of methane: A review," Cuihua Xuebao/Chinese J. Catal., vol. 32, No. 1-2, pp. 207-216, 2011, doi: 10.1016/S1872-2067(10)60166-0.
C. E. Tornow, M. R. Thorson, S. Ma, A. A. Gewirth, and P. J. A. Kenis, "Nitrogen-based catalysts for the electrochemical reduction of CO 2 to CO," J. Am. Chem. Soc., vol. 134, No. 48, pp. 19520-19523, 2012, doi: 10.1021/ia308217w.
J. W. Raebiger et al., "Electrochemical reduction of CO 2 to CO catalyzed by a bimetallic palladium complex," Organometallics, vol. 25, No. 14, pp. 3345-3351, 2006, doi: 10.1021/om060228g.
S. Rasul, D. H. Anjum, A. Jedidi, Y. Minenkov, L. Cavallo, and K. Takanabe, "A highly selective copper-indium bimetallic electrocatalyst for the electrochemical reduction of aqueous CO2to CO," Angew. Chemie—Int. Ed., vol. 54, No. 7, pp. 2146-2150, 2015, doi: 10.1002/anie.201410233.
Cyrille Costentin et al., "A Local Proton Source Enhances CO2 Electroreduction to CO by a Molecular Fe Catalyst," Science (80-. )., vol. 338, No. October, pp. 90-94, 2012.
Y. Song et al., "High-Selectivity Electrochemical Conversion of CO2 to Ethanol using a Copper Nanoparticle/N-Doped Graphene Electrode," ChemistrySelect, vol. 1, No. 19, pp. 6055-6061, 2016, doi: 10.1002/slct.201601169.
C. T. Dinh et al., "CO2 electroreduction to ethylene via hydroxide-mediated copper catalysis at an abrupt interface," Science (80-. )., vol. 360, No. 6390, pp. 783-787, 2018, doi: 10.1126/science.aas9100.
D. Kim, C. S. Kley, Y. Li, and P. Yang, "Copper nanoparticle ensembles for selective electroreduction of CO2 to C2-C3 products," Proc. Natl. Acad. Sci. U. S. A., vol. 114, No. 40, pp. 10560-10565, 2017, doi: 10.1073/pnas.1711493114.
J. Wang, H. Wang, Z. Han, and J. Han, "Electrodeposited porous Pb electrode with improved electrocatalytic performance for the electroreduction of CO2 to formic acid," Front. Chem. Sci. Eng., vol. 9, No. 1, pp. 57-63, 2015, doi: 10.1007/s11705-014-1444-8.
R. L. Cook, "Electrochemical Reduction of Carbon Dioxide to Methane at High Current Densities," J. Electrochem. Soc., vol. 134, No. 7, p. 1873, 1987, doi: 10.1149/1.2100776.
K. Liu, W. A. Smith, and T. Burdyny, "Introductory Guide to Assembling and Operating Gas Diffusion Electrodes for Electrochemical CO 2 Reduction," ACS Energy Lett., vol. 4, No. 3, pp. 639-643, 2019, doi: 10.1021/acsenergylett.9b00137.
B. Ashford and X. Tu, "Non-thermal plasma technology for the conversion of CO2," Curr. Opin. Green Sustain. Chem., vol. 3, pp. 45-49, 2017, doi: 10.1016/j.cogsc.2016.12.001.
J. Rosen et al., "Mechanistic Insights into the Electrochemical Reduction of CO2 to CO on Nanostructured Ag Surfaces," ACS Catal., vol. 5, No. 7, pp. 4293-4299, 2015, doi: 10.1021/acscatal.5b00840.
M. E. Dry, "The Fischer-Tropsch process: 1950-2000," Catal. Today, vol. 71, No. 3-4, pp. 227-241, 2002, doi: 10.1016/S0920-5861(01)00453-9.
D. Ren, N. T. Wong, A. D. Handoko, Y. Huang, and B. S. Yeo, "Mechanistic Insights into the Enhanced Activity and Stability of Agglomerated Cu Nanocrystals for the Electrochemical Reduction of Carbon Dioxide to n-Propanol," J. Phys. Chem. Lett., vol. 7, No. 1, pp. 20-24, 2016, doi: 10.1021/acs.jpclett.5b02554.
F. Proietto, B. Schiavo, A. Galia, and O. Scialdone, "Electrochemical conversion of CO2 to HCOOH at tin cathode in a pressurized undivided filter-press cell," Electrochim. Acta, vol. 277, pp. 30-40, 2018, doi: 10.1016/j.electacta.2018.04.159.
E. Bertin, S. Garbarino, C. Roy, S. Kazemi, and D. Guay, "Selective electroreduction of CO2 to formate on Bi and oxide-derived Bi films," J. CO2 Util., vol. 19, No. May, pp. 276-283, 2017, doi: 10.1016/j.jcou.2017.04.006.
F. Köleli, T. Ropke, and C. H. Hamann, "Electrochemical impedance spectroscopic investigation of CO2 reduction on polyaniline in methanol," Electrochim. Acta, vol. 48, No. 11, pp. 1595-1601, 2003, doi: 10.1016/S0013-4686(03)00076-8.
J. B. Vennekoetter, R. Sengpiel, and M. Wessling, "Beyond the catalyst: How electrode and reactor design determine the product spectrum during electrochemical CO2 reduction," Chem. Eng. J., vol. 364, No. Dec. 2018, pp. 89-101, 2019, doi: 10.1016/j.cej.2019.01.045.
Corresponding European patent application No. 21849128.0 extended search report dated Dec. 19, 2024.

* cited by examiner

ELECTROCHEMICAL CELL FOR CARBON DIOXIDE REDUCTION TOWARDS LIQUID CHEMICALS

CROSS-REFERENCE TO RELATED APPLICATIONS

The present application claims priority from U.S. provisional patent application No. 63/057,375, filed on Jul. 28, 2020, incorporated herein by reference.

TECHNICAL FIELD

The present disclosure relates to the field of electrochemistry, and more particularly to electrochemical cells for converting $CO_2$ into liquid chemicals.

BACKGROUND

The last decades have seen extensive use of fossil fuel that emitted large amounts of carbon dioxide in the atmosphere. The increase of $CO_2$ concentration in the atmosphere is one of the main reasons for climate change that we are starting to experience with its devastating consequences, including a rise in sea level, droughts and higher frequency of extreme meteorological events. $CO_2$ is still massively emitted to this day despite efforts of energy transition towards renewable energy.

A promising avenue is to consider $CO_2$ as a feedstock in the production of strategic chemicals. However, $CO_2$ is one of the most stable molecules that exist and thus requires a high amount of energy to break down. Several techniques exist to accomplish such a transformation, including photochemical [1], carbon dioxide reforming [2] or using plasma [3]. However, these techniques are energy intensive with low conversion yields. Electrochemistry is promising for $CO_2$ conversion in order to reach a larger scale and commercialization.

In this context, research over the last four decades focused on finding efficient catalysts that decrease the amount of energy required for the electrochemical conversion. Most promising catalysts are converting $CO_2$ with high current density at low potential, high stability, high faradaic efficiency, high selectivity toward specific and useful chemicals. The catalyst is generally driving the outcome products of the $CO_2$ conversion. Some catalysts are highly efficient to transform $CO_2$ into carbon monoxide (CO) [4]—[8]. CO has to further be processed with clean hydrogen coming from a water electrolyser through an energy intensive Fischer-Tropsch process to obtain fuel [9]. This method is however not economically viable. Copper is one of the only known metals able to directly convert $CO_2$ into complex molecules containing two or more carbon atoms, such as ethanol [10], propanol [11], ethylene [12], and many others [13]. The main difficulty with copper-based catalysts is to selectively convert $CO_2$ into one product with high faradaic efficiency. Post-transition metals such as tin [14], lead [15] or bismuth [16] can efficiently convert $CO_2$ into formic acid with high selectivity and high faradaic efficiency in alkaline conditions.

Most literature studies test the catalyst in a H-cell configuration, with two or three electrodes [17], [18]. The H-cell is made of two compartments separated by an ion exchange membrane. The two compartments are filled with electrolytes and the electrodes are fully immersed in the electrolyte. The electrodes consist of the working electrode (i.e. the tested catalyst), the reference electrode to specifically study the $CO_2$ electroreduction and the counter-electrode (typically a platinum wire). $CO_2$ is dissolved in the electrolyte on the cathode side and the electrochemical activity is monitored thanks to a potentiostat that reversibly varies the potential and record the current density. This type of cell is simple and mostly aims to offer a screening technique when comparing different catalysts. Catalysts in H-cells suffer from limited reaction rates due to poor solubility of $CO_2$ as well as depletion of $CO_2$ near the catalyst. Electrochemical cells with appropriate geometry are thus required to implement efficient catalysts.

Efficient cells have been developed for water electrolysis, where water is split into hydrogen and oxygen gases, and generally use a membrane electrode assembly (MEA). A MEA consists of catalysts being deposited on gas diffusion layers that are pressed together with an ion exchange membrane between them. Similar assemblies give poor results when applied to $CO_2$ conversion due to high hydrogen production instead of $CO_2$ production [19]. Recent studies start to show efficient cells toward $CO_2$ conversion [20].

SUMMARY

The present disclosure pertains to an electrochemical cell and to the different components required to obtain an efficient electrochemical cell for converting $CO_2$ into liquid chemicals. Preferential materials are also described for making these components as well as the way of assembling them into a functioning electrochemical cell and a cell stack.

The present electrochemical cell introduces carbon dioxide into the cathodic compartment, where reduction of the carbon dioxide is performed at the cathode.

A broad aspect is an electrochemical cell configured for reducing carbon dioxide that is introduced into the electrochemical cell. The electrochemical cell includes an anode electrode; a cathode electrode comprising a porous support including metal acting as a catalyst; an anion exchange membrane, wherein the anion exchange membrane separates an anodic compartment from a cathodic compartment, wherein the cathodic compartment includes a catholyte, the cathode electrode and the carbon dioxide, and the anodic compartment includes an anolyte and the anode electrode; the anolyte and the catholyte are composed of a liquid electrolyte solution with a concentration between 0.1M-10M, wherein anions of the electrolyte solution are adapted to diffuse from the cathodic compartment to the anodic compartment through the anion exchange membrane, wherein the carbon dioxide contacts the cathode electrode and the catalyst converts electrochemically the carbon dioxide into C1-C2 liquid organic by-products and the anions at the catholyte, wherein the cathode electrode and the anode electrode are adapted to be electrically connected to a power source through one of current collector plates; and a wired connection.

In some embodiments, the electrochemical cell may include a first spacer between the cathode electrode and the anion exchange membrane to maintain a constant distance between the cathode electrode and the anion exchange membrane; and/or a second spacer between the anode electrode and the anion exchange membrane to maintain a constant distance between the anode electrode and the anion exchange membrane.

In some embodiments, the first spacer may cause a turbulence in the catholyte to improve the conversion of the carbon dioxide, and/or the second spacer may cause a turbulence in the anolyte to improve the conversion of hydroxide ions into oxygen.

In some embodiments, the cathodic compartment may include a dry compartment; a wet compartment containing the catholyte; and a gas diffusion layer separating the dry compartment and the wet compartment, wherein the carbon dioxide is injected into the dry compartment and diffused across the gas diffusion layer into the catholyte of the wet compartment.

In some embodiments, the gas diffusion layer may act as the cathode electrode, the gas diffusion layer including a microporous support with a catalyst deposited thereon, the catalyst composed of metal particles selected from one or more post-transition metals.

In some embodiments, the cathode electrode and the anode electrode may be electrically connected through the current collector plates including a cathode plate and an anode plate.

In some embodiments, the cathode electrode and the anode electrode may be electrically connected through a wired connection, further comprising a corrosion-resistant plastic support comprising a pattern on a surface of the plastic support for promoting diffusion of carbon dioxide contacting the cathode electrode to the catalyst.

In some embodiments, the corrosion-resistant plastic support may be composed of polyethylene or polypropylene.

In some embodiments, the metal may coat the porous support.

In some embodiments, the liquid electrolyte solution may include potassium hydroxide.

In some embodiments, the metal acting as a catalyst may be selected from tin, lead, indium, bismuth, tin oxide, lead oxide, indium oxide, bismuth oxide and copper.

In some embodiments, the metal acting as a catalyst may be doped with one or more of nitrogen and sulfur.

In some embodiments, the anode electrode may be composed from iron, nickel, cobalt, magnesium, in one or more of metallic, oxide, hydroxide or (oxy)hydroxide forms; or platinum or palladium.

In some embodiments, the anode electrode may be composed of a nickel foam.

In some embodiments, the C1-C2 liquid organic biproducts may be formate and formic acid.

In some embodiments, the porous support of the cathode electrode may be composed of stainless steel coated with anti-corrosive metal, or from graphite.

Another broad aspect is a cell stack comprising a plurality of electrochemical cells as defined herein; two endplates for compressing the plurality of electrochemical cells, positioned between the two endplates; and a carbon dioxide inlet for introducing carbon dioxide into the cell stack.

In some embodiments, the two endplates may be composed of stainless steel.

In some embodiments, the cell stack may include a catholyte outlet for evacuating from the cell stack catholyte by-products of the reduction carried out at the cathode electrode.

In some embodiments, the cell stack may include an anolyte outlet for evacuating from the cell stack anolyte by-products of the oxidation carried out at the anode electrode.

In some embodiments, the cell stack may include a carbon dioxide outlet for recirculating carbon dioxide into the plurality of electrochemical cells of the cell stack for increasing reaction between the carbon dioxide and the catalyst.

In some embodiments, the carbon dioxide that is introduced into the cell stack through the carbon dioxide inlet may be part of a flue gas.

Another broad aspect is a cell stack for reducing carbon dioxide that is introduced into the cell stack. The cell stack includes a plurality of electrochemical cells comprising an anode electrode; a cathode electrode comprising a porous support including metal acting as a catalyst; an anion exchange membrane, wherein the anion exchange membrane separates an anodic compartment from a cathodic compartment, wherein the cathodic compartment includes a catholyte, the cathode electrode and the carbon dioxide, and the anodic compartment includes an anolyte and the anode electrode; the anolyte and the catholyte are composed of a liquid electrolyte solution with a concentration between 0.1M-10M, wherein anions of the electrolyte solution is adapted to diffuse from the cathodic compartment to the anodic compartment through the anion exchange membrane, wherein the carbon dioxide contacts the cathode electrode and the catalyst converts electrochemically the carbon dioxide into C1-C2 liquid organic by-products and the anions at the catholyte; wherein the cathode electrode and the anode electrode are electrically connected through current collector plates, wherein a current collector plate is shared between two neighboring electrochemical cells as a bipolar plate, acting as an anode plate for one electrochemical cell of the two neighboring electrochemical cells and as a cathode plate for the other electrochemical cell of the two neighboring electrochemical cells.

Another broad aspect is a method of reducing carbon dioxide using an electrochemical cell, wherein carbon dioxide is introduced in an electrolyte solution in a cathodic compartment of the electrochemical cell. The method includes reducing the carbon dioxide at a cathode electrode of the electrochemical cell, the cathode electrode including a metal catalyst that is contacting the catholyte, the cathode electrode including pores for increasing contact area between the metal catalyst and the carbon dioxide, the reduction resulting in the production of anions that diffuse across an anion exchange membrane towards an anodic compartment, the anions oxidizing at an anode electrode, producing oxygen as a result of the oxidation.

In some embodiments, the carbon dioxide contacting the cathode electrode to the metal catalyst may be diffused using a cathode plate with a pattern for promoting the diffusion of carbon dioxide.

In some embodiments, the electrolyte solution may include potassium hydroxide, and wherein the anions are hydroxide ions.

In some embodiments, the porous support may be composed of stainless steel coated with anti-corrosive metal, or from graphite.

In some embodiments, the method may include, prior to the reducing, diffusing the carbon dioxide from a dry compartment of the cathodic compartment to a wet compartment of the dry compartment comprising the electrolyte solution through a gas diffusion layer.

In some embodiments, the cathode electrode may be joined to or integrated in the gas diffusion layer.

In some embodiments, the method may include replacing the electrolyte solution through a bottom of the electrochemical cell in order to push the oxygen by-product out through an outlet located at a top of the anodic compartment.

In some embodiments, the carbon dioxide may be part of a flue gas introduced into the cathodic compartment.

BRIEF DESCRIPTION OF THE DRAWINGS

The invention will be better understood by way of the following detailed description of embodiments of the invention with reference to the appended drawings, in which.

DETAILED DESCRIPTION

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

From the foregoing it will be appreciated that, although specific embodiments have been described herein for purposes of illustration, various modifications may be made without deviating from the spirit and scope of the teachings. Accordingly, the claims are not limited by the disclosed embodiments.

Definitions

In the present disclosure, by "electrochemical cell" or "electrolyser cell", it is meant a device that is capable of generating electrical energy either from chemical reaction(s) or using electrical energy to cause chemical reaction(s).

Figure 1:
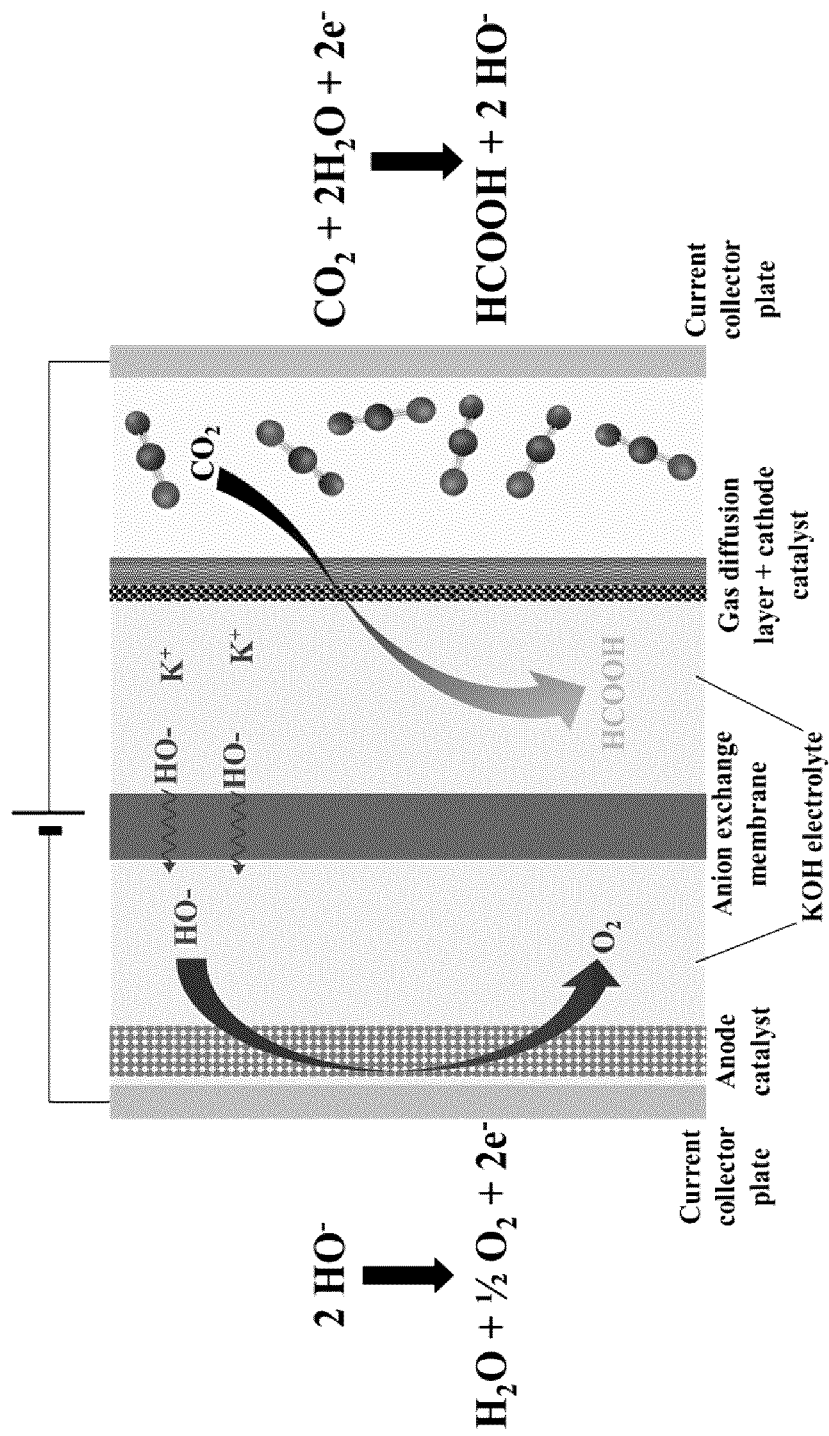
FIG. 1 is a schematic of an exemplary electrochemical cell, illustrating an exemplary $CO_2$ conversion process in the exemplary electrochemical cell.

Exemplary Electrochemical Cell:

Reference is made to FIG. 1, illustrating an exemplary electrochemical cell for converting carbon dioxide in accordance with the present embodiments.

The electrochemical cell includes a cathodic compartment and an anodic compartment, containing the anolyte. The cathodic compartment may be divided, as illustrated in FIG. 1, into a dry compartment for receiving the carbon dioxide, and a wet compartment, containing the catholyte. The dry compartment of the cathodic compartment and the wet compartment of the cathodic compartment may be separated by a gas diffusion layer, where the cathode may be joined to or integrated into the gas diffusion layer. The gas diffusion layer enables the carbon dioxide to diffuse from the dry compartment to the wet compartment through the gas diffusion layer. The cathodic compartment and the anodic compartment are separated with an anion exchange membrane, enabling transfer of anions from the cathodic compartment to the anodic compartment.

As explained herein, in some embodiments, the cathodic compartment may include a single wet compartment, where the carbon dioxide gas is injected directly into the electrolyte of the cathodic compartment. No dry compartment is present in this example.

On the cathode side from FIG. 1, $CO_2$ is injected, e.g., in the dry compartment and diffused to a catalyst that is in contact with the electrolyte, a solution of potassium hydroxide, sodium hydroxide, potassium bicarbonate, sodium bicarbonate, a mixture of potassium and sodium bicarbonate, etc. For purposes of illustration, the present disclosure will refer to KOH as the electrolyte. However, it will be understood that other electrolyte solutions may be used in accordance with the present embodiments. The electrolyte may have a concentration ranging anywhere from 0.1 M to 10.0 M. In some examples, the electrolyte may have a concentration ranging anywhere from 5.0 to 10.0 M.

The injected $CO_2$ may be pure, or may have certain impurities (e.g. extracted from flue gas), with traces of nitrogen oxide, nitrogen dioxide, nitrogen, carbon monoxide, water, etc. (preferably no sulfur oxides or particle matters.) One molecule of $CO_2$ reacts with two molecules of water and two electrons to produce C1-C2 liquid organic by-products, namely a molecule of formic acid, and two hydroxide ions. It will be understood that the reaction may produce other by-products, such as ethanol, methanol, ethanoic acid, etc. The hydroxide ions diffuse through the anion exchange membrane from the cathode side to the anode side. In contact with the anode catalyst, two hydroxide ions produce a molecule of water, oxygen and two electrons. It can be noted that formic acid, in a highly basic environment is found under the form of formate ions ($HCOO^-$). The two electrodes are surrounded by sealing gaskets and the assembly is connected electrically through a wired connection or is pressed between two current collector plates. The current collector plates have a flow pattern engraved on their surface for gas and liquid management. The sealing gaskets prevent any leaks from the cell. The current collector plates also deliver electricity to the electrolyzer cell.

Figure 2:
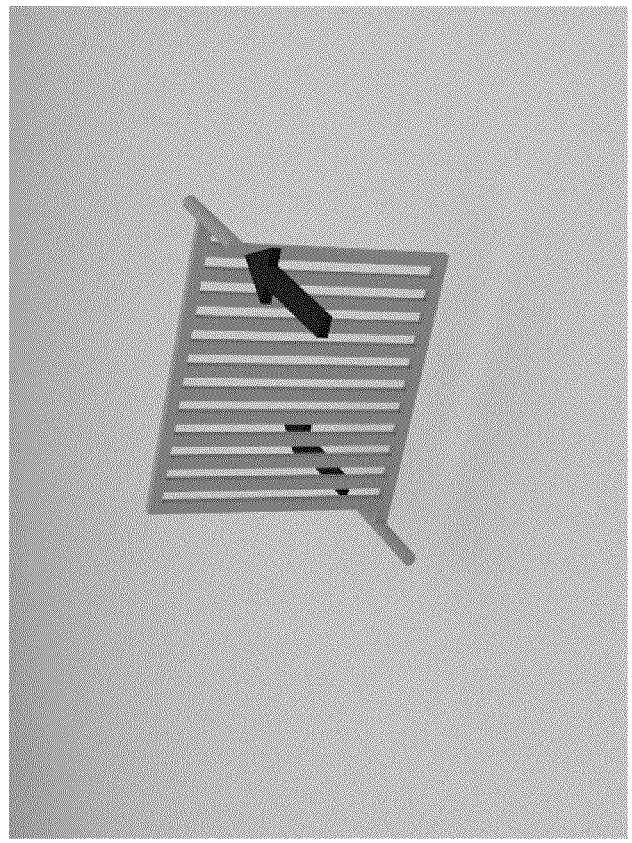
FIG. 2 shows an exemplary cathode plate with an engraved pattern on the left and the $CO_2$ flow pattern on the right. The arrows represent the $CO_2$ inlet and outlet.
Figure 2:

In some examples, a cathode plate (FIG. 2) may be used in the electrochemical cell. First, the electrochemical plate ensures a homogeneous current distribution to the cathode electrode. The plate is a good electrical conductor to limit ohmic losses. In addition, an engraved pattern allows $CO_2$ in contact with the electrode to diffuse to the catalyst. The pattern is chosen such that the pressure losses are minimized. In this case, FIG. 2 exhibits preferentially a straight pattern and can consist, but non-exhaustively, of single serpentine, multiple serpentine or interdigitated patterns. The plate also has a high corrosion resistance due to the contact with a strong base, the potassium hydroxide (KOH) electrolyte. Graphite can be used for the plate due to its high electrical conduction, high corrosion resistance in presence of a base and ease to machine to the desired shape. The plate can also be made of stainless steel coated with metals offering protection against corrosion, such as Nickel or Titanium.

In some embodiments, the cathode plate (i.e. a current collector plate) made of metal (stainless steel, titanium) or graphite may be used, collecting electrons from the electrode that is in contact with the current collector plate.

In some embodiments, instead of the cathode plate, a corrosion-resistant plastic support may be used, where the flow pattern may be engraved on a plastic (e.g. polyethylene, polypropylene) support and the electrode is either wired to the electrical circuit, or in contact with metallic tape (e.g. copper tape) fixed on the plastic support to collect electrons and connect the plastic support to the electrical circuit.

Figure 3:
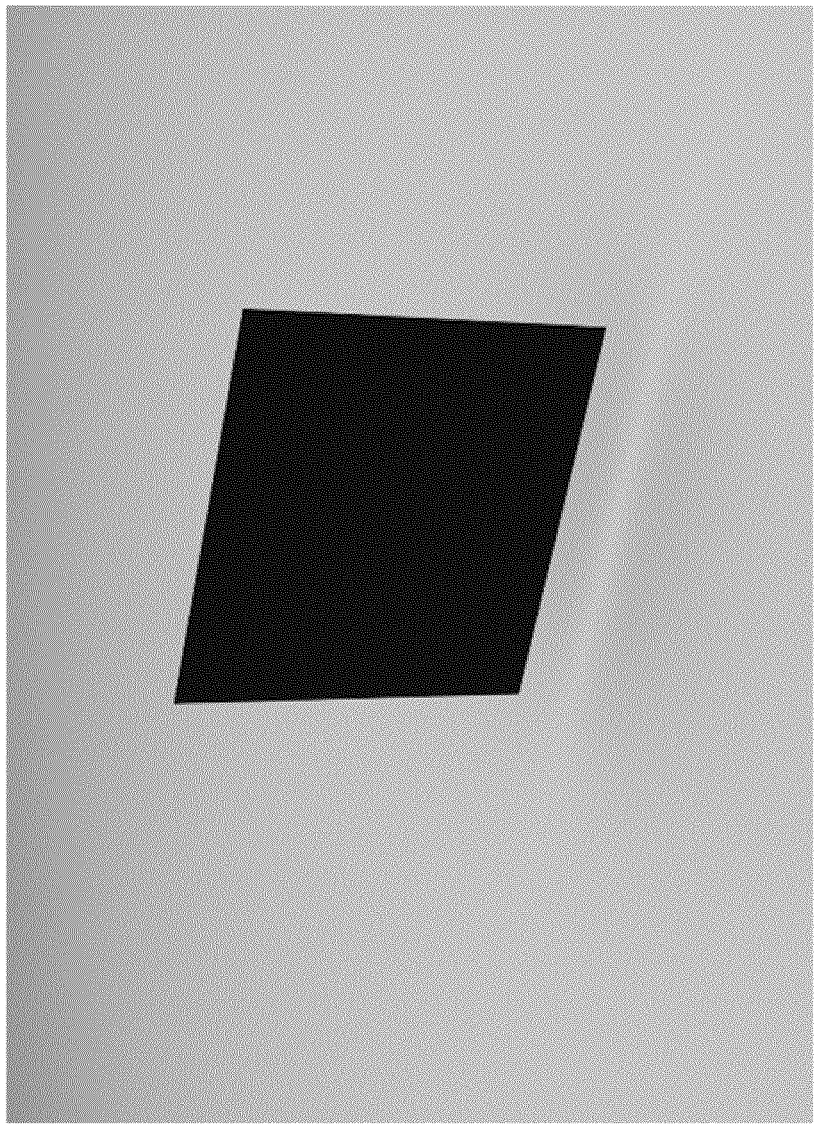
FIG. 3 is an exemplary cathode electrode composed of a catalyst deposited on a gas diffusion layer.

The cathode electrode (FIG. 3) may be made of two components: a microporous support (e.g. made of carbon or metal), such as a gas diffusion layer (GDL), and a catalyst. The gas diffusion layer, as its name indicates, allows gaseous $CO_2$ to diffuse from the dry compartment to the catalyst, where the electrochemical reaction takes place. Gas diffusion layers may consist of pressed carbon fibers into a carbon paper. Commercial grades include Sigracet™, Freudenberg™ or Toray™ carbon papers. The gas diffusion layer may also include a microporous layer made of activated carbon as well as a hydrophobic treatment made of PTFE (polytetrafluoroethylene). The GDL is resistant to corrosion caused by the KOH electrolyte.

The cathode catalyst is directly responsible for the electrochemical reaction of $CO_2$ and water into liquid chemicals such as formic acid.

In some embodiments, the catalyst may be made from metal particles, preferentially at nanometric level to maximize surface area of contact with reactant. In other embodiments, the catalyst can also be used under the form of micrometric particles or even in bulk (e.g. the catalyst is structured of porous solid layers of metal, where no additional gas diffusion layer is required for depositing the catalyst thereon). The metal particles are part of the post-transition metals, a group of elements with high electronegativity and lower melting and boiling point than transition metals. Among the post-transition metals, tin, lead, indium, bismuth, tin oxide, lead oxide, indium oxide, bismuth oxide, metals doped with nitrogen and/or sulfur (e.g. tin doped with sulfur) have high reactivity and selectivity towards formic acid. Copper is recognized as a metal having a high reactivity towards numerous chemicals (methanol, ethanol, ethylene, propylene and many others) but with a lower selectivity.

The metal (e.g. metal particles) can be dispersed directly on the gas diffusion layer or on a carbon support that help to maintain performance stability and can even enhance it in certain cases. The support generally consists of crystallized forms of carbon or commercially available powders of active carbon for example. The metal may be deposited on the porous substrate by different depositing techniques, such as electroplating.

Figure 4:
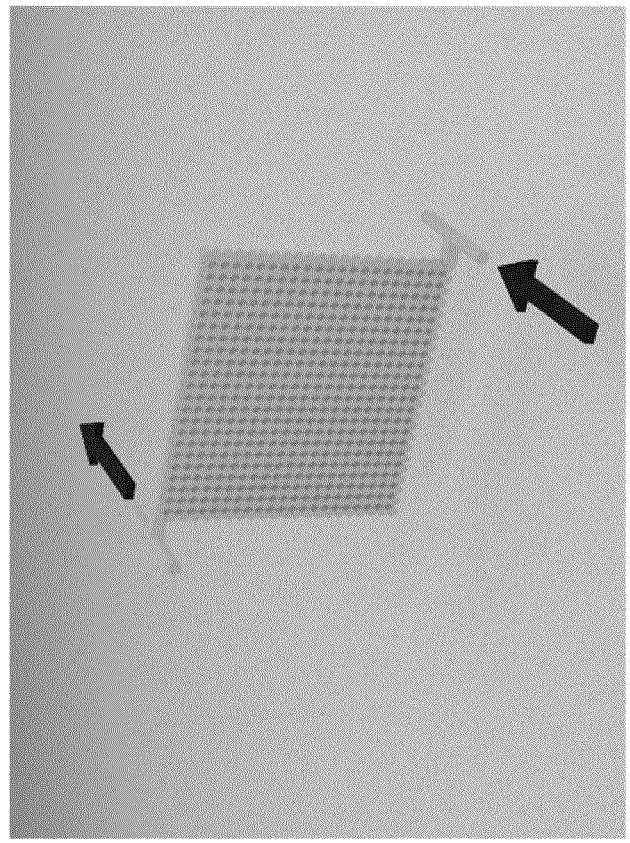
FIG. 4 is an exemplary physical spacer shown on the left with the electrolyte flow path going through the spacer on the right. The arrows represent the electrolyte inlet and outlet.
Figure 4:
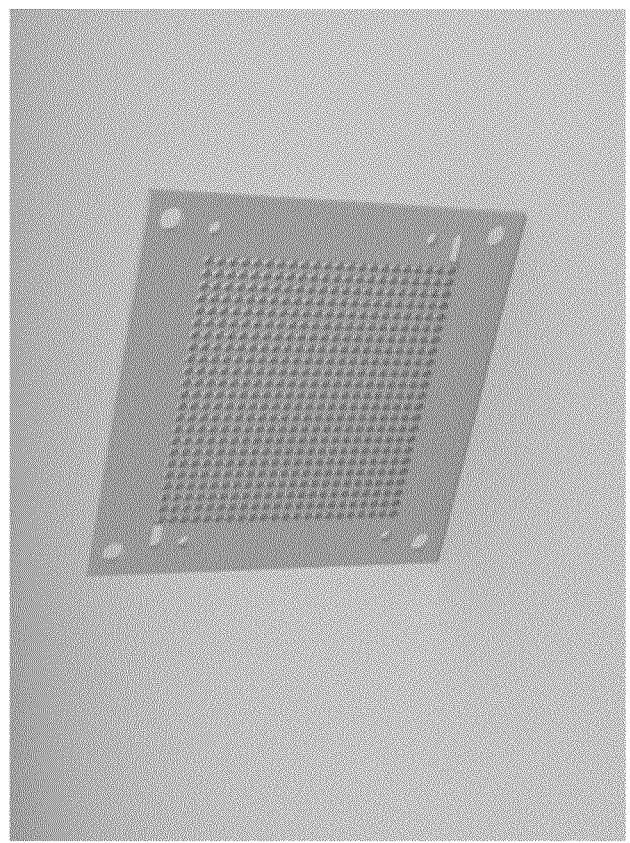

A physical spacer (FIG. 4) may be added between the cathode electrode and the anion exchange membrane. This spacer is used to maintain a constant distance between the electrode and the membrane. The spacer can thus prevent physical deformation of the electrode and the membrane, and limit the fluctuations of ion conductivity along the cell. KOH electrolyte flows through the spacer holes to get in contact with the electrode and react with $CO_2$ to produce the desired chemical, and then flush the products towards the exhaust. The geometry of the spacer is optimized to limit the accumulation of product close to the electrode and thus maximize electrolyte renewal in the cell. The electrolyte may be injected from the bottom to the top to prevent trapping of gas bubbles in the cell. In some examples, the spacer may be configured to cause turbulence in the liquid solution to enhance mass transfer and increase the rate of carbon dioxide conversion (e.g. the spacer acting as or creating obstacles for the fluid, resulting in turbulence).

The physical spacer is corrosion-resistant but does not have to be electrically conductive since no electrons have to be transported through the spacer. For this reason, the physical spacer can be made of polyethylene and/or polypropylene that present good mechanical properties. In some examples, the geometry of the spacer is such that the geometry minimizes contact between the spacer and the cathode electrode to avoid size reduction of the cathode electrode (e.g. contact can be minimized through the use of pins that contact the cathode electrode, etc.)

In some examples, a physical spacer may be present between the anode electrode and the anion exchange membrane to further maintain the distance between the electrodes and the anion exchange membrane.

Figure 5:
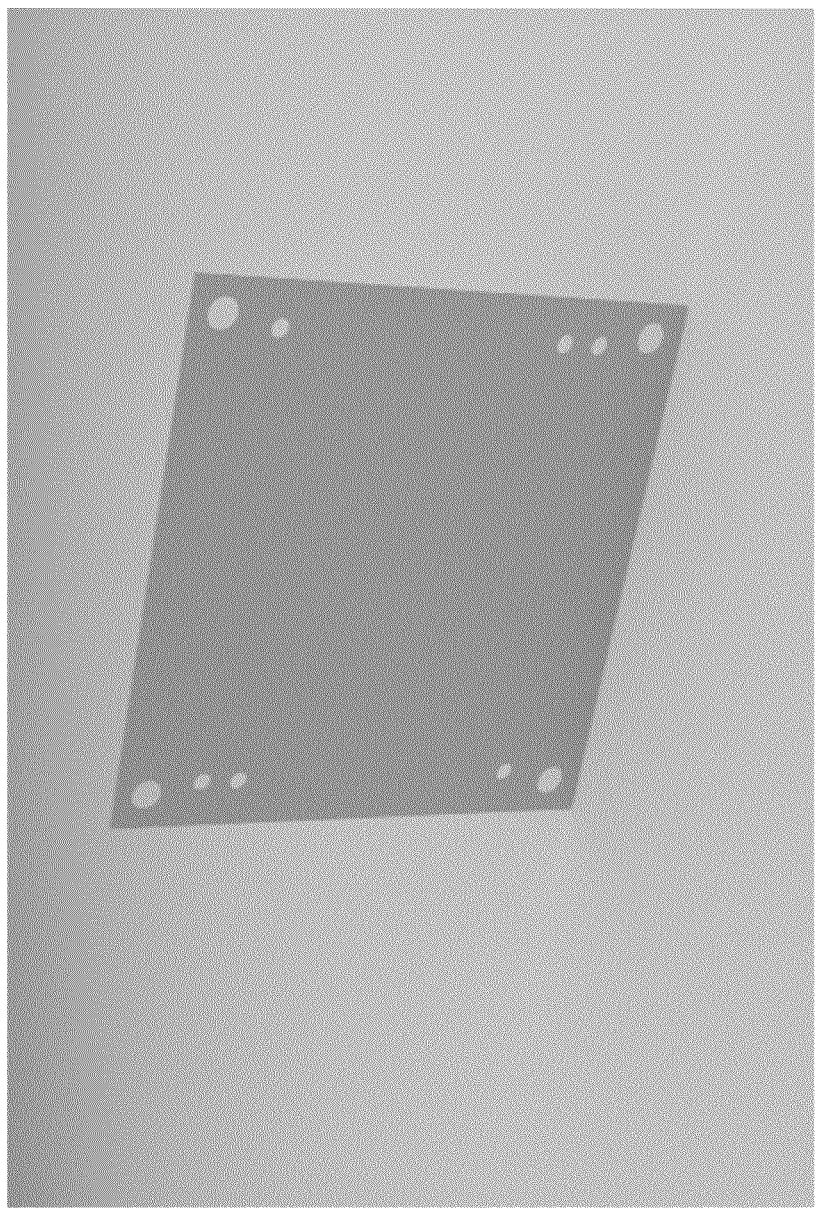
FIG. 5 represents an exemplary anion exchange membrane.

The anion exchange membrane (FIG. 5) is surrounded by the KOH electrolyte at the anode and at the cathode. The anion exchange membrane allows hydroxide ions to diffuse from the cathode to the anode. In the meantime, the membrane prevents other products to pass from one side to the other and is electrically insulative. The concentrations of the electrolyte on both sides are identical in order to limit osmotic pressure on the membrane. These membranes can be found commercially (Fumasep™, Sustainion™, etc.) or synthesized to optimize their properties regarding ion transport. Anion exchange membranes are composed of one or more ionomers, i.e. a polymer of both neutral and ionized monomers. The ionized monomers can include non-exhaustively quaternary ammonium, imidazolium, guanidinium, pyridinium, phosphonium, sulfonium, etc.

Figure 6:
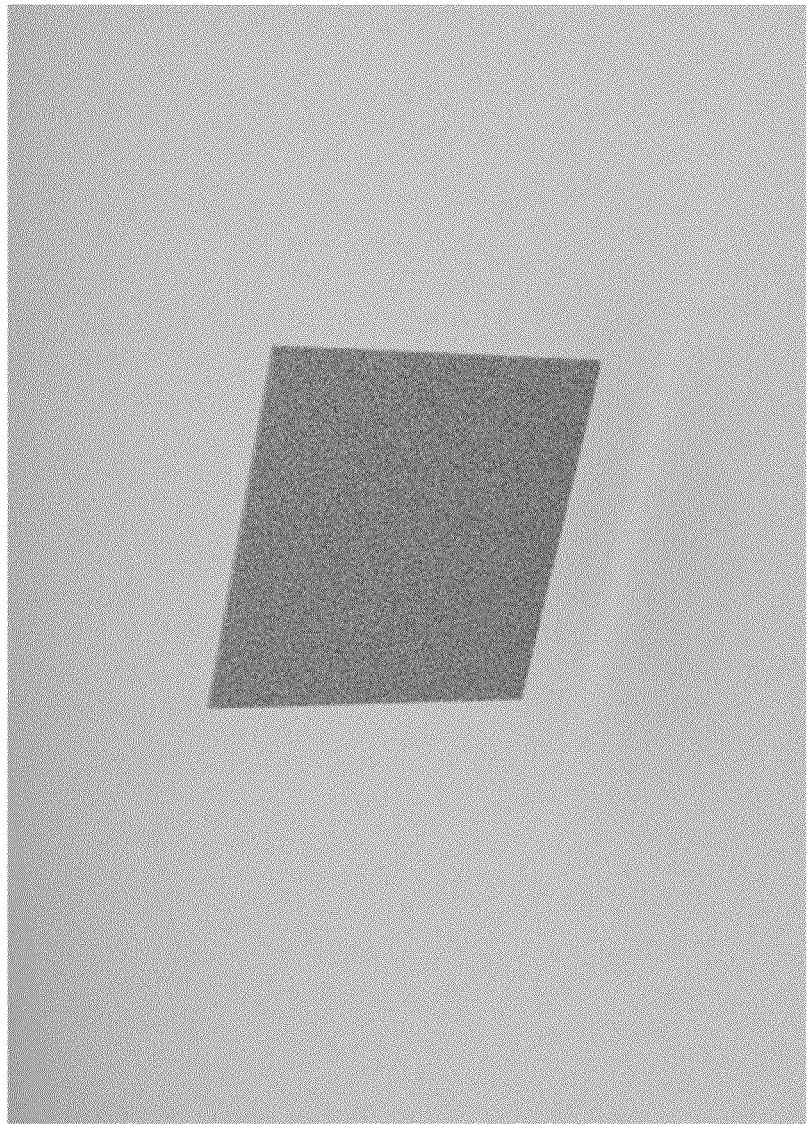
FIG. 6 is an exemplary anode catalyst that consists of commercially available nickel foam.

The anode catalyst (FIG. 6) completes the overall electrochemical reaction of $CO_2$ towards the liquid chemical by transforming hydroxide ions to oxygen gas and electrons that are transported to the cathode side. Nickel foam is a possible choice for the anode catalyst due to its high reactivity in a basic environment, its corrosion resistance in high pH and its large specific surface area. Other catalysts for the oxygen evolution reaction can include some transition metals (Fe, Ni, Co, Mg) in metallic, oxide, hydroxide or (oxy)hydroxide form as well as noble metals such as platinum or palladium. Noble metals are however not the preferred choice due to high cost. The metals can be included in the cell under the form of a foam, such as the nickel foam or on a gas diffusion layer, such as the one used on the cathode side. The foam form can increase contact between the electrolyte and the electrode, while also contributing to turbulence of the liquid. Other exemplary anodes may be in the form of a metal wire or a metal plate.

Figure 7:
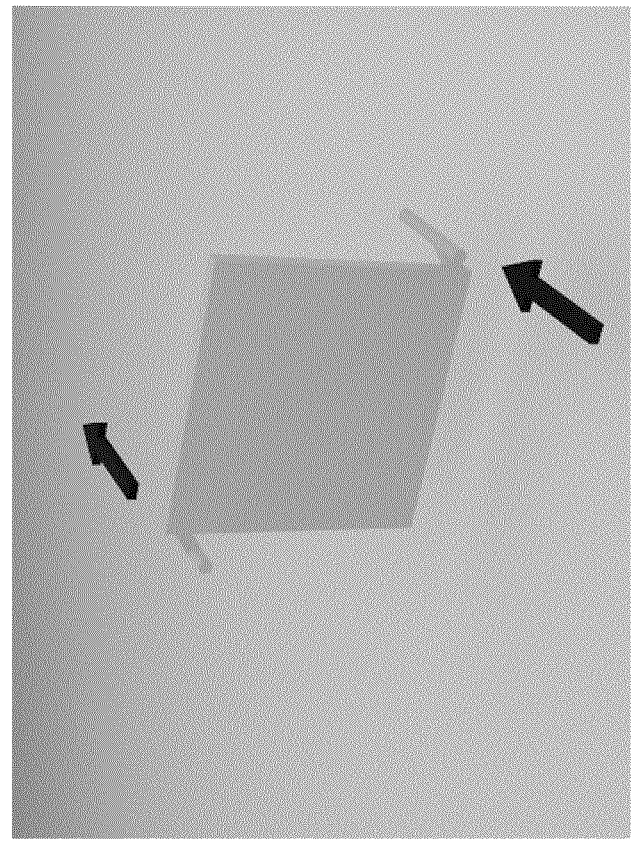
FIG. 7 is an exemplary anode plate shown of the left and the electrolyte flow path on the right. The arrows represent the electrolyte inlet and outlet.
Figure 7:

The plate on the anode side (FIG. 7) holds the anode electrode in place and allows the electrolyte to flow in contact with the electrode and the anion exchange membrane. The plate also collects electrons generated during the oxygen evolution reaction that are transported to the cathode side. Similarly to the cathode plate, the anode plate has good corrosion protection and high electrical conductivity and is made of the same material as the cathode plate. The electrolyte may flow from the bottom to the top in this compartment to evacuate the oxygen bubbles generated during the electrochemical reaction.

In one embodiment, in a stack of several cells, the anode and cathode plates can also be merged together into a bipolar plate where one face is engraved with the pattern for $CO_2$ flow while the other side is engraved with $CO_2$ flow patterns (or, in some examples, the KOH electrolyte pattern), where two neighboring cells can share the same anode electrode.

Figure 8:
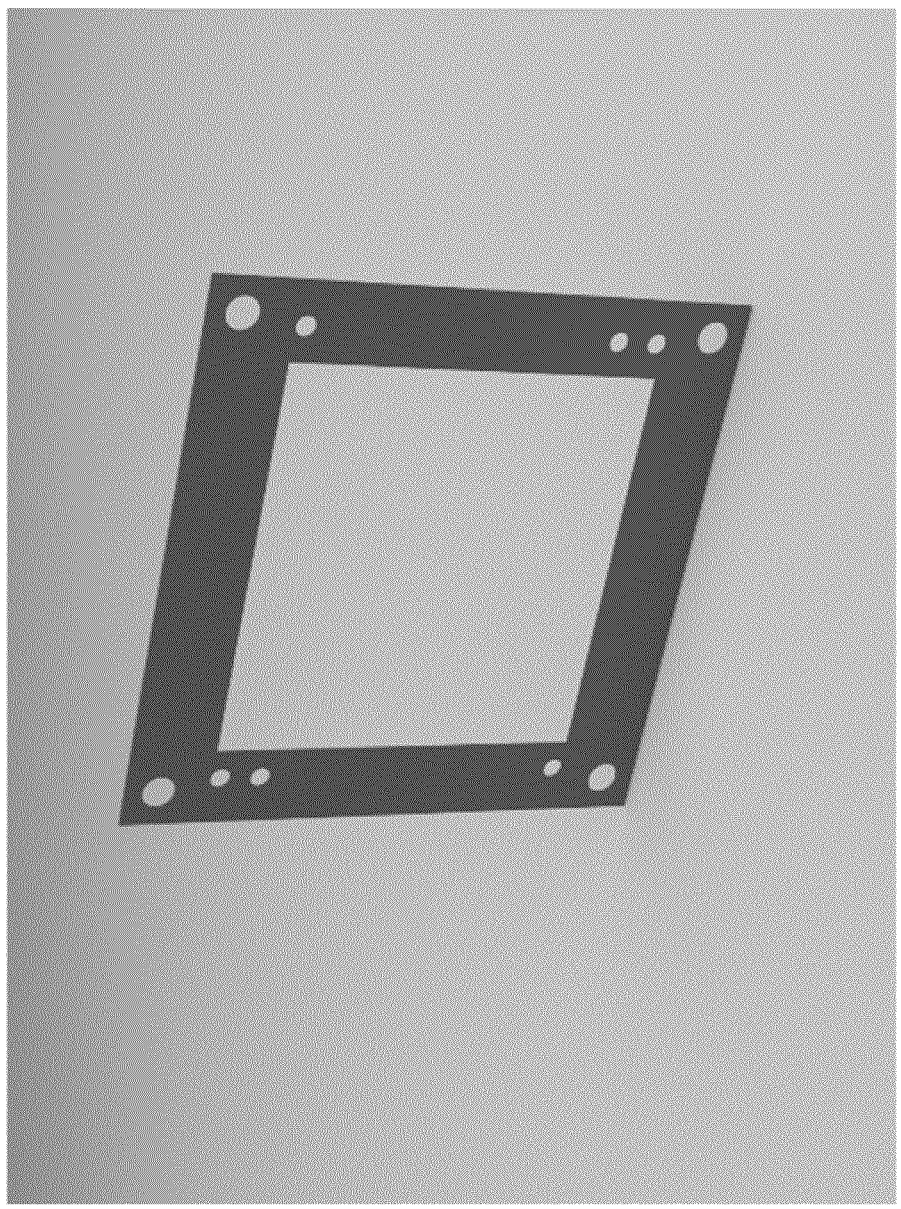
FIG. 8 is an exemplary leak-prevention gasket.

Gaskets (FIG. 8) are placed in the cell to prevent leaks from the different compartments: $CO_2$ compartment, cathode electrolyte compartment and anode electrolyte compartment. The gaskets also prevent leaks in the manifolds ensuring product transport among the cells. The gaskets are made of chemically stable polymer with strong mechanical properties under compression. Commercially available gaskets are based on Teflon, silicone, rubber, Mylar laminate or Kapton.

Figure 9:
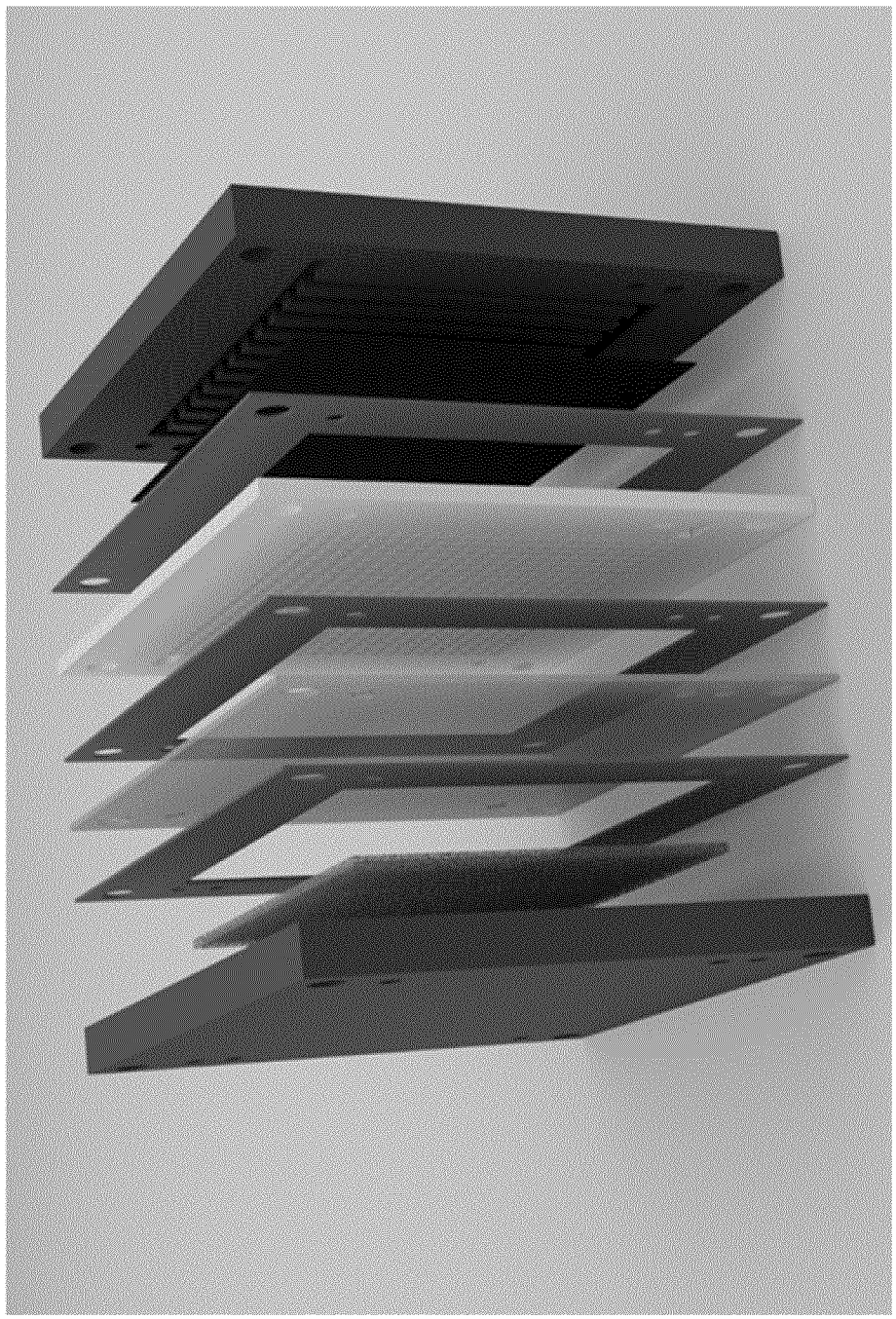
FIG. 9 is an exemplary exploded view of the cell assembly.

An electrochemical cell converting $CO_2$ into liquid chemicals is assembled (FIG. 9) with the above-mentioned components in the following order:
cathode plate
cathode electrode
sealing gasket
physical spacer
sealing gasket
anion exchange membrane
sealing gasket
anode electrode
anode plate In some embodiments, a voltage of less than 10 V is present in the electrochemical cell. In some embodiments, a voltage of less than 4 V is present in the electrochemical cell.

In some embodiments, the current density that each electrode generates is higher than 100 $mA/cm^2$. In some embodiments, the current density that each electrode generates is higher than 200 $mA/cm^2$. When a higher current density is present, the system may be more compact, where less electrode surface area is required.

In some embodiments, the faradaic efficiency may be higher than 50% towards formate. In some embodiments, the faradaic efficiency may be higher than 90% towards formate. A high faradaic efficiency improves the energy efficiency of the system, and also simplifies the separation of formate from electrolyte as a post-processing treatment.

Figure 10:
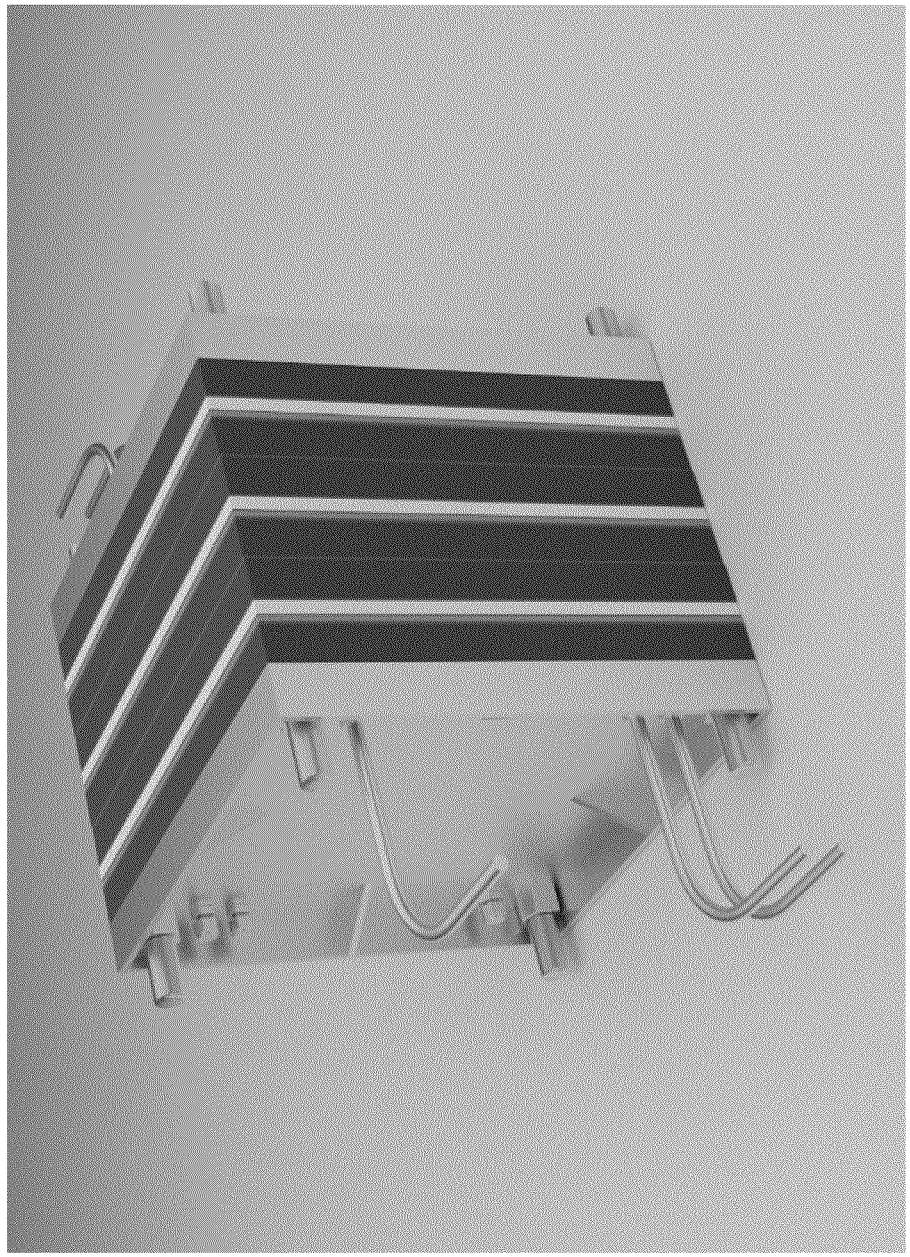
FIG. 10 is an exemplary stack of three electrochemical cells encased between two endplates.

In some examples, $CO_2$ electrochemical cells are assembled into a cell stack and compressed between two end plates (FIG. 10). The end plates ensure the structural integrity of the stack while providing inlets and outlets to the different manifolds. The end plates can be made of a corrosion-resistant metal with good mechanical properties (e.g. high tensile strength, low flexibility, etc., for reducing movement of the two endplates), such as stainless steel, for its mechanical properties. Anode and cathode plates in the middle of the stack can be merged into bipolar plates for higher compactness and lower leak risks.

In some embodiments, the cell stack includes a $CO_2$ inlet with $CO_2$ coming from either storage, or direct feed from industrial plant, or a $CO_2$ capture plant.

The cell stack may also include a $CO_2$ outlet, where the $CO_2$ can be recirculated in the cell stack. The cell stack may also include an electrolyte inlet in order to supply the electrolyte from a source (e.g. storage container) of the electrolyte solution.

In some embodiments, the cell stack includes an anolyte outlet, for evacuating from the cell stack anolyte that has been degassed from produced oxygen. The concentration and composition of the remaining electrolyte may be adjusted prior to being recirculated into the cell stack.

In some embodiments, the cell stack includes a catholyte outlet for evacuating from the cell stack one or more of components of a catholyte containing electrolyte solution, formate and dissolved carbonates. The catholyte may undergo separation by distillation and purification of the products. Remaining electrolyte will have its concentration adjusted before being recirculated into the cell stack.

In some embodiments, the electrochemical cell includes two compartments instead of three. A first compartment includes the anolyte, where the second compartment contains the catholyte. In these embodiments, carbon dioxide is not introduced into a compartment that is separate from the cathodic compartment by a gas diffusion layer. Instead, carbon dioxide is injected directly into the cathodic compartment, where the cathode is immersed in the catholyte. A turbulator may be present to further mix the carbon dioxide in the catholyte. The other features of the two-compartment electrochemical cell are shared with those of the three-compartment electrochemical cell.

Figure 11:
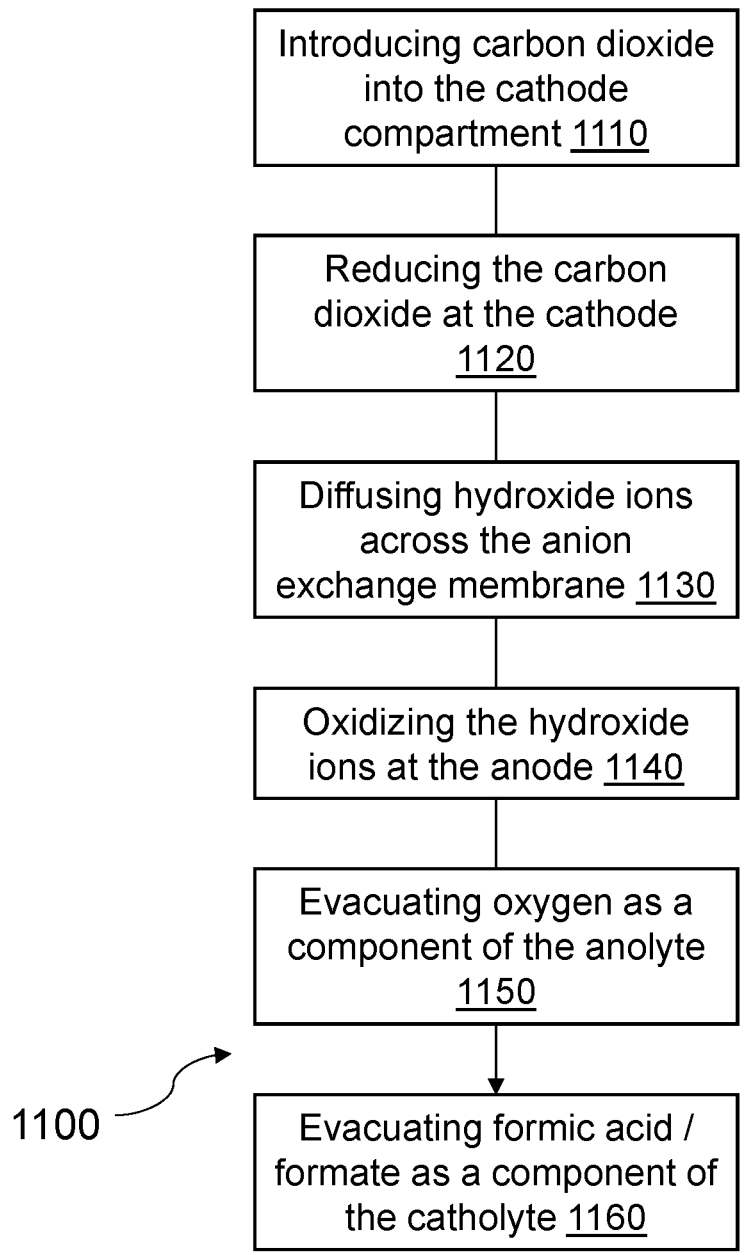
FIG. 11 is a flowchart diagram of an exemplary method of reducing carbon dioxide using an exemplary electrochemical cell in accordance with the present embodiments.

Exemplary Method of Reducing Carbon Dioxide Using an Electrochemical Cell:

Reference is now made to FIG. 11, illustrating an exemplary method 1100 of reducing carbon dioxide into liquid chemicals using one or more electrochemical cells in accordance with the present disclosure. The electrochemical cell may be that of FIG. 1 or another in accordance with the embodiments described herein.

Carbon dioxide is first introduced into the electrochemical cell, namely the cathode compartment of the electrochemical cell at step 1110. The carbon dioxide may be injected into a dry compartment that is separate from the cathodic compartment using a gas diffusion layer. In this example, the cathode catalyst may be joined to or integrated in the gas diffusion layer. The gaseous carbon dioxide may then diffuse from the dry compartment, through the gas diffusion layer, into the wet cathodic compartment. In other examples, the carbon dioxide may be introduced directly into the cathodic compartment (the carbon dioxide outlet leading to the cathodic compartment).

Optionally, in some embodiments, the catholyte may be mixed or stirred using, e.g., a turbulator, in order to increase contact between the carbon dioxide present in the electrolyte solution of the cathodic compartment.

The carbon dioxide is then reduced at the cathode at step 1120 into, as two main byproducts: formate/formic acid and hydroxide ions. It will be understood that the reduction may also reduce in other by-products, produced in lesser quantities, such as ethanol, ethanoic acid, etc.

The anion exchange membrane enables the transfer of hydroxide ions from the cathodic compartment to the anodic compartment at step 1130.

The hydroxide ions are then oxidized at the anode at step 1140 into water and oxygen as byproducts.

The oxygen is evacuated from the anodic compartment at step 1150, e.g. by pushing electrolyte from the bottom of the anodic compartment, thereby pushing the oxygen up and out of the electrochemical cell, through an anolyte outlet.

By-products from the reduction of carbon dioxide, other than the hydroxide ions, are removed from the cathodic compartment at step 1160, e.g., evacuated through the anolyte outlet. Carbon dioxide can be recirculated into the cathodic compartment in order to increase reaction between the carbon dioxide and the catalyst of the cathode electrode.

As the method 1100 is performed in an electrochemical cell, and a plurality of electrochemical cells may compose a cell stack, the method 1100 may be performed in some or all of the electrochemical cells of the cell stack.

Exemplary Studies:

The following exemplary studies are provided to enable the skilled person to better understand the present disclosure. As they are but illustrative and representative examples, they should not limit the scope of the present disclosure, only added for illustrative and representative purposes. It will be understood that other exemplary studies may be used to further illustrate and represent the present disclosure without departing from the present teachings.

Exemplary Study 1:

The setup of an exemplary electrochemical cell was first determined.

The components of an assembled electrochemical cell for conversion of $CO_2$ to formic acid could be presented in the following order, as shown in FIG. 1:

cathode plate with etched flow channels, where $CO_2$ is injected, cathode, consisting of a catalyst dispersed on a gas diffusion layer (GDL) which is hydrophobic and helps to form a gas-liquid interface between the microporous layer and the catalyst, gasket, ideally made of Viton, cathode compartment frame is used to maintain a constant distance between the cathode and the anion exchange membrane, gasket, anion exchange membrane, gasket, anode, made of nickel foam for the reaction of oxygen release by oxidation of OH— ions, anode plate is an etched compartment to hold the anode electrode and circulate the electrolyte.

The $CO_2$ is injected into a dry gas compartment and diffused through GDL to the catalyst layer which is in contact with the potassium hydroxide solution (electrolyte). The $CO_2$ reduction reaction occurs on the catalyst surface. In this reaction, one molecule of $CO_2$ reacts with two molecules of water and two electrons to produce one molecule of formic acid and two hydroxide ions. The hydroxide ions produced pass through the anion exchange membrane to the anode. In the anode compartment, the hydroxide ions are directly reduced to oxygen and water.

The overall electrochemical reduction reaction of $CO_2$ to formic acid in the aqueous electrolyte is presented by equation (1):

$$CO_2 (g) + 2H_2O (aq) \rightarrow HCOOH + O_2 (g) + H_2 (g) \qquad (1)$$

Exemplary Study 2:

The materials for the electrochemical cell were then selected.

The materials and equipment that were used are shown in Table 1.

TABLE 1

| Unit | Components | Supplier |
|---|---|---|
| Cathode substrate (Gaz Diffusion Layer-GDL) | 1. Sigracet 39 BB graphite paper. | Fuel Cell Store, USA |
| | 2. CeTech carbon cloth W1S1010 | Fuel Cell Store, USA |
| Catalyst ink | Commercial graphene | Raymor, Canada |
| | Tin sulfate ($SnSO_4$) | Sigma-Aldrich, USA |
| | Ethanol | Greenfield Global, Canada |
| | Demineralized water | Laboratoire |
| | Nafion ~5% in mixture of lower aliphatic alcohols and water | Sigma-Aldrich, USA |

TABLE 1-continued materials and equipment used.

| Unit | Components | Supplier |
|---|---|---|
| Anode | Nickel foam | MTI |
| Cell | Anion exchange membrane (MEA) | Fuel Cell Store, USA |
|  | Viton Gasket | McMaster, USA |
|  | High-Temperature Silicone Rubber Gasket 1/32" thick | McMaster, USA |
|  | 3 compartments in polyethylene (PE) | Plastiques Usinés Clément inc, Canada |
|  | Gauges | Basco, USA |
| Electrolyte | KOH | VWR |
| Rectifier XKW 20-50 |  | XANTREX, USA |
| Pyrolysis | Carbolite CTF tube furnace equipped with a quartz tube under nitrogen flow. | Carbolite, USA |
| $CO_2$ | $CO_2$ gaz | Messer, Canada |

The cathode used in the exemplary electrochemical cell represents the carbon substrate covered by the catalytic layer. In order to deposit the catalytic layer, the NAFION™ polymer-based ink is produced in three steps.

In the first step, the mixture is prepared for pyrolysis in the furnace. The proportions of the components to produce 2 g of catalyst are as follows:
- 1.3 g of commercial graphene,
- 1.6 g of tin sulfate,
- 0.2 L of ethanol and
- 0.2 L of demineralized water.

The preparation of the mixture is started by dispersing the graphene in ethanol using an ultrasonic bath until complete dispersion. Then, water and tin sulfate are added while continuing the treatment in the ultrasonic bath. This suspension is put in the oven at 100° C. until complete evaporation of the liquid phase. The mixture is then removed from the oven, cooled and ground before the second step.

The second step of the catalyst preparation is pyrolysis under nitrogen atmosphere at 700° C.

The last step of catalyst ink preparation consists of the preparation of the catalyst suspension after pyrolysis in the mixture of ethanol with water in the following proportions: 1 g of pyrolyzed sample powder, 200 mL of ethanol and 800 μL of the NAFION™ solution.

Figure 12:
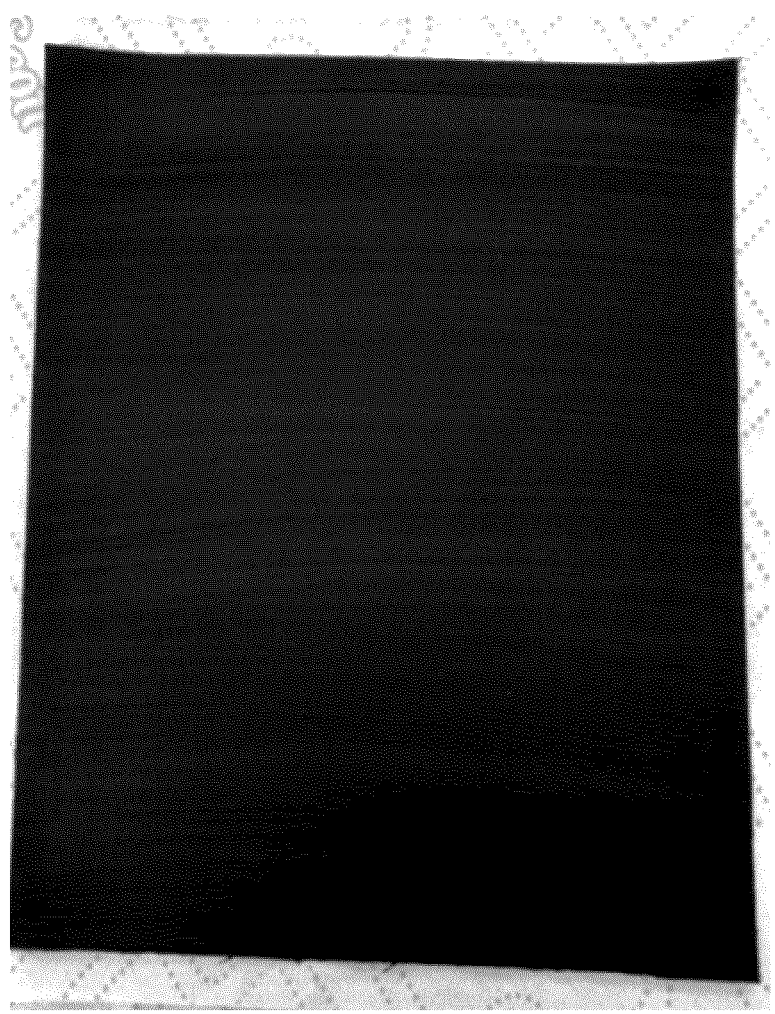
FIG. 12 is a picture of the cathode covered by the catalyst, ink deposited on the graphite fabric with a brush.

The ink was deposited on the substrate using the compressed air sprayer (air spray) and brush. The brush method of ink deposition is preferred for this example. After each ink spread, the substrate was put in the oven at 80° C. to dry for 30 seconds (complete evaporation of the solvent). The amount of catalyst deposited on the electrode is around 1.25 mg/cm². The cathode covered by the catalyst is shown in FIG. 12.

Figure 13:
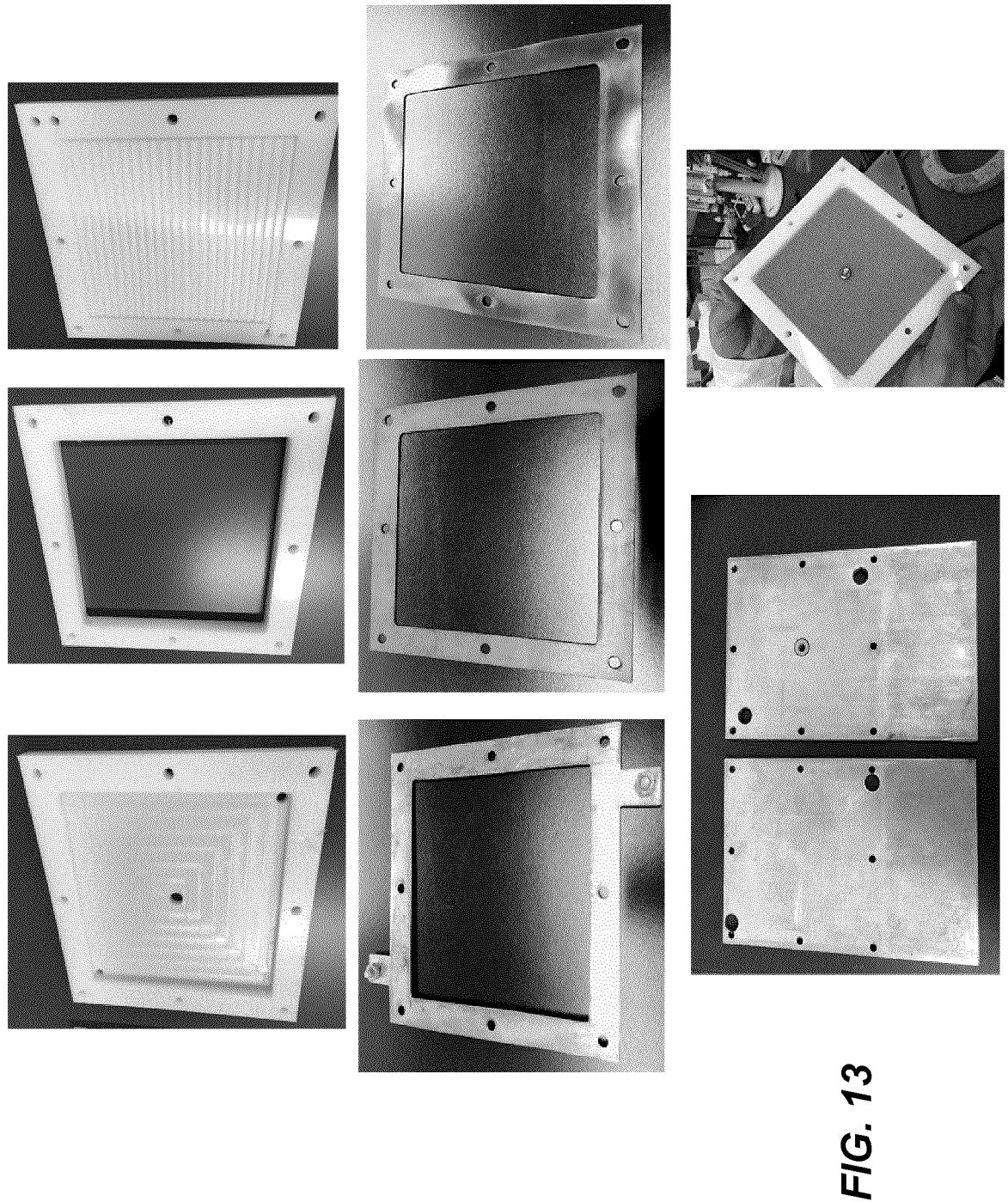
FIG. 13 are pictures of components of the electrochemical cell from left to right respectively: first row: anodic behavior frame, cathodic behavior frame and gas behavior frame. Second row: the copper electrical contact, the silicone and Viton gaskets respectively. Third row: stainless steel support plates and nickel foam anode placed in the anodic behavior frame.
Figure 14:
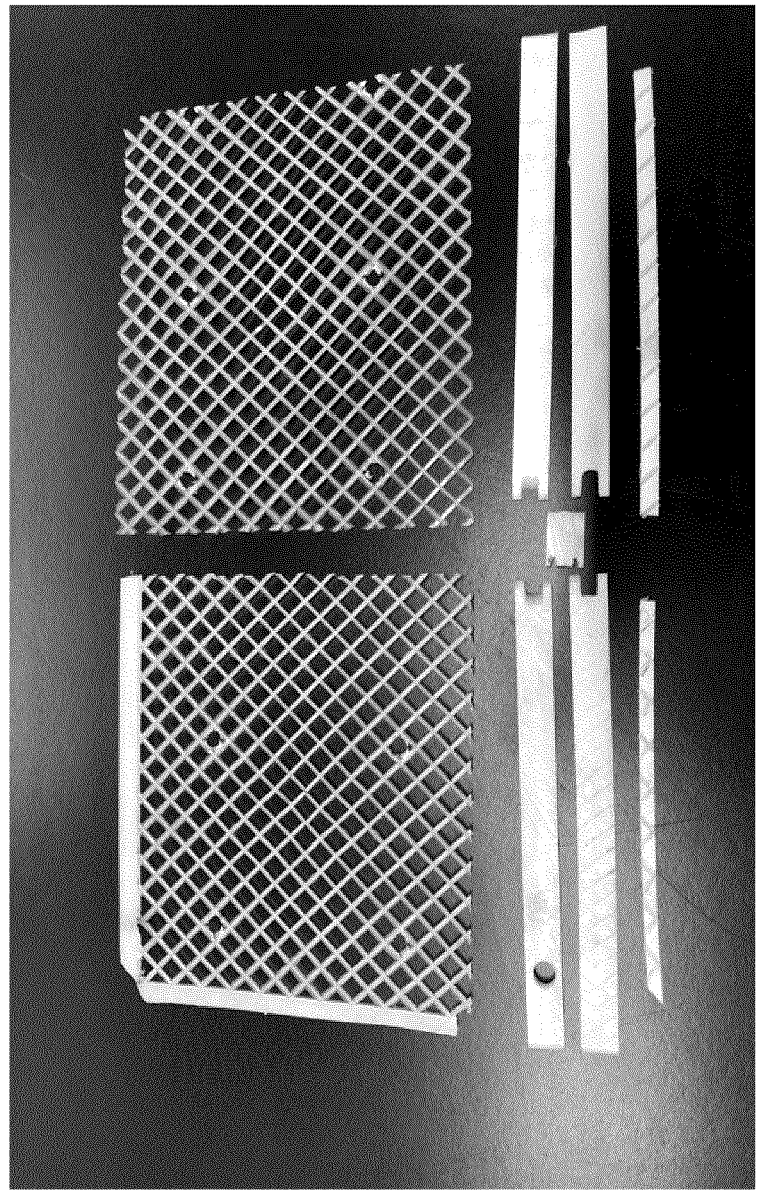
FIG. 14 is a picture of exemplary spacers used for an exemplary electrochemical cell.
Figure 15:
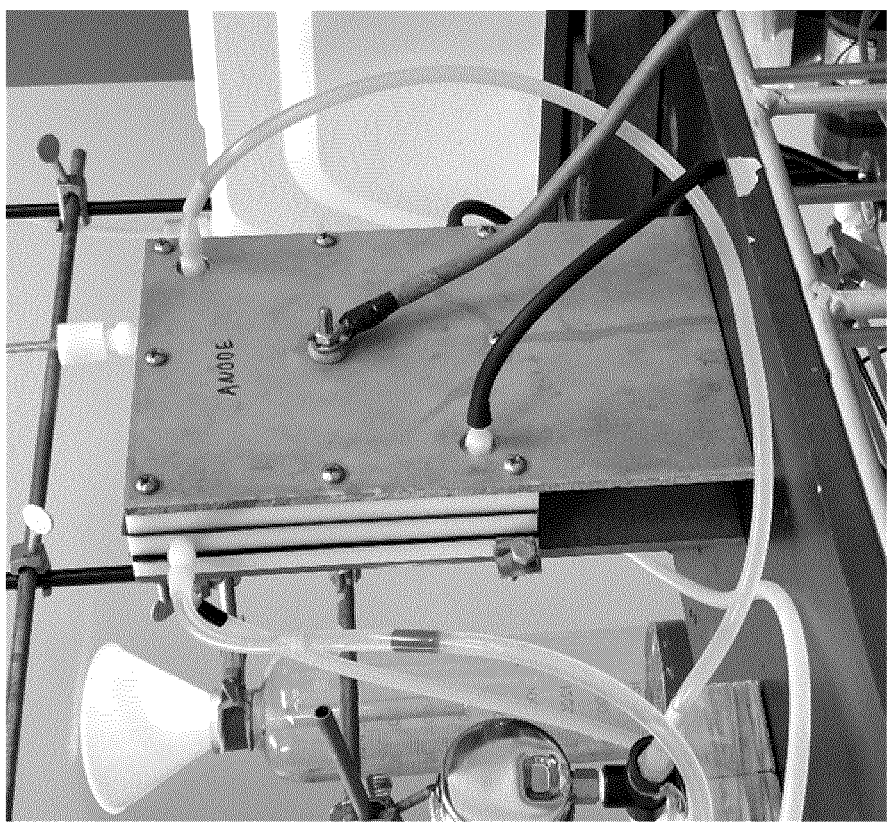
FIG. 15 is a picture of an assembled exemplary electrochemical cell.

The electrochemical cell components are shown in FIG. 13. FIG. 14 shows exemplary spacers. FIG. 15 shows the assembled exemplary electrochemical cell.

Exemplary Study 3:

Concentrate of formate in the sample was then measured.

The formate in the sample was first converted to formic acid by adding acid and then analyzed on a BioRad™ Aminex HPX-87H column heated to 50° C., the solvent used was 95% $H_2SO_4$ 0.008 N/5% Acetonitrile with a flow rate of 0.8 mL/min for 35 minutes. The detection is done with DAD at 210 nm. The final concentrations were all calculated in formic acid.

Figure 16:
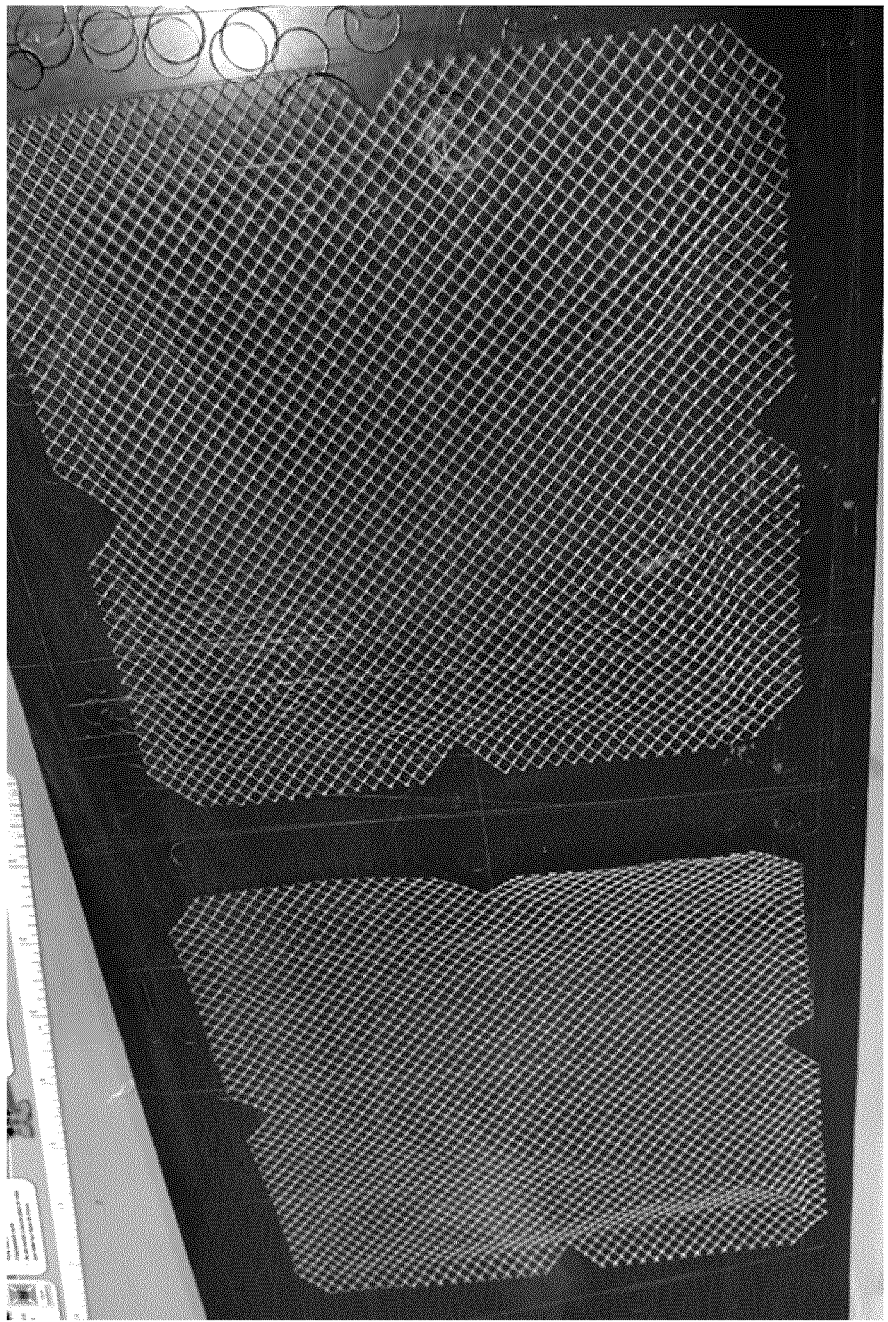
FIG. 16 is a picture of exemplary spacers used for an exemplary study.

The feasibility of formate production in the three-compartment cell with 200 cm² of active surface was first evaluated. For this test, a first version of the spacers shown in FIG. 16 was used, one on each side of the anion exchange membrane.

Figure 17:
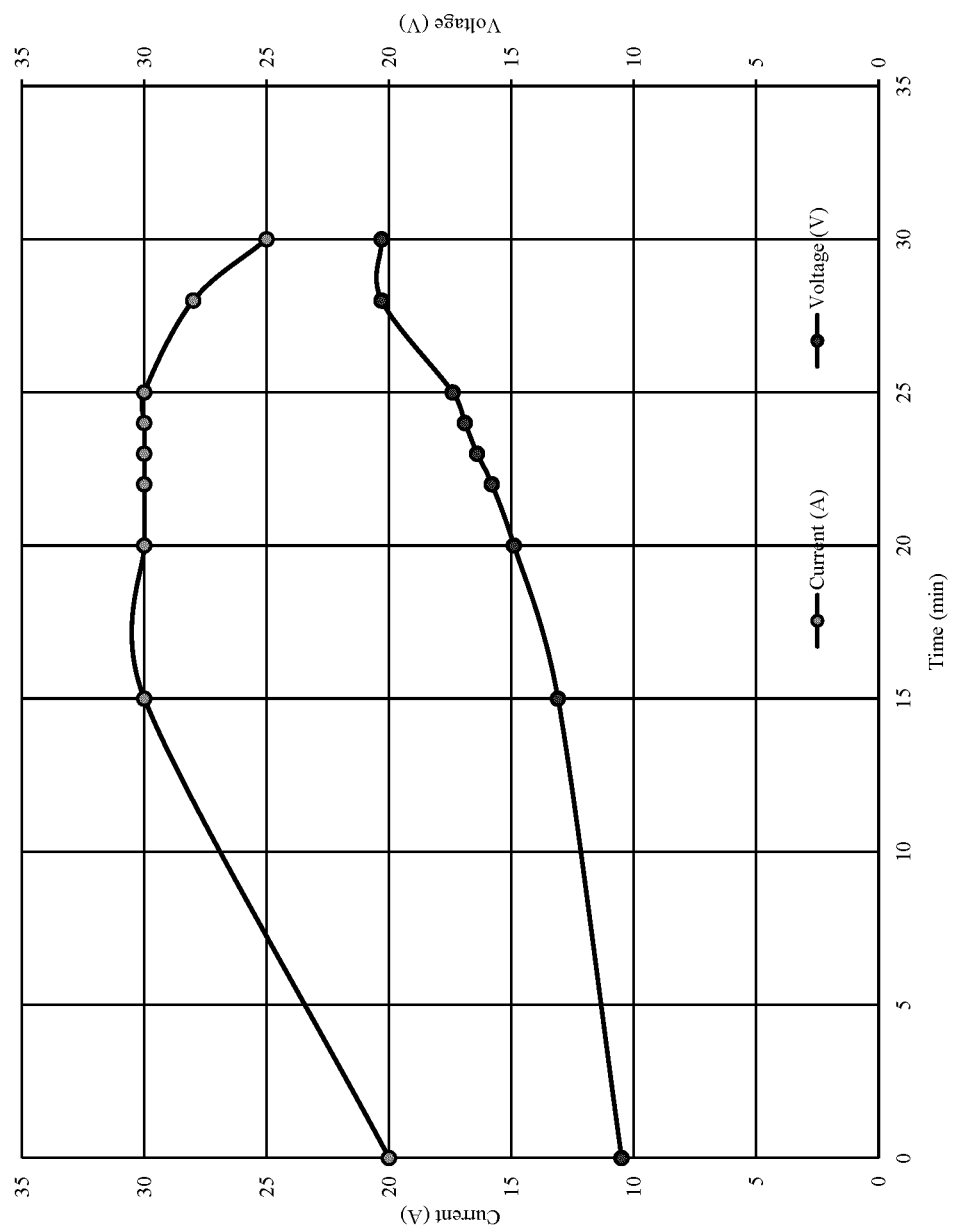
FIG. 17 is a graph illustrating changes in current and voltage as a function of time during an exemplary study.
Figure 18:
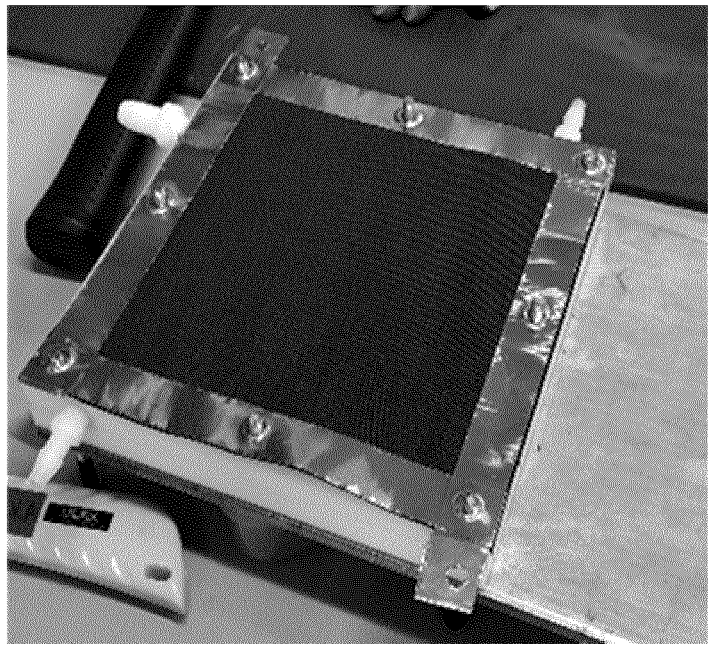
FIG. 18 are pictures of the connection of exemplary copper tape around a carbon substrate.
Figure 18:
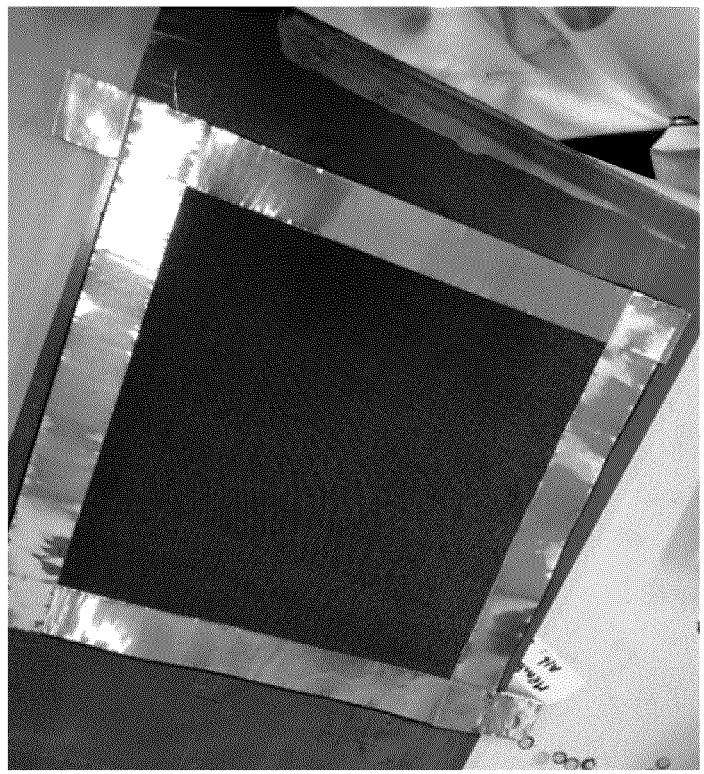

A constant current of 30 A was tested, which corresponds to 150 mA/cm². The test duration was limited to 30 minutes due to the continuous voltage rise to the rectifier limit at 20.3 V at the 28th minute of the test. After this point, the electric current started to decrease (FIG. 17). It should be noted that in this test the recommended current of 40 A could not be applied because of the high electrical resistances where the copper tape was connected around the carbon substrate (FIG. 18). The gas pressure in the cathode compartment and the solutions in the anode compartments and between the cathode and the membrane varied between 0.2 and 1.5 psi. The electrolytes were circulating in a closed circuit, but the flow rates were sometimes very slow (drip). In this test, the peristaltic pump was used to feed the cell with electrolytes. The degradation of the cathode was not observed during the test. The catholyte flow was observed at the gas outlet of the cell. The volume of catholyte flowed at this location during the test was 200 mL. This problem was probably caused by the difference in pressures in the three compartments of the cell.

The results of the HPLC formate analysis, initial parameters and current yield are presented in Table 2. The final calculated current yield for this test is 37.1%.

TABLE 2 analysis results and current yield for exemplary study 3.

| Sample | Concentration of formic acid $CH_2O_2$ (mg/L) | Concentration of formate (mg/L) | Volume of electrolyte (mL) | Time (min) | Current (A) | Voltage (V) | Current yield (%) |
|---|---|---|---|---|---|---|---|
| C002 | 21 | 20 | 1000 | 2 | 30 | 13.1 | 3.62 |
| C030 | 4449 | 4350 | 800 | 30 | 30 | 20.3 | 37.08 |
| Gaz leakage | 2099 | 2050 | 200 | 30 | n/a | n/a |  |

Exemplary Study 4:

The electrical resistance of the copper cathode connection was then studied for enabling an electrical current of 40 A and to have a mechanically strong contact.

Figure 19:
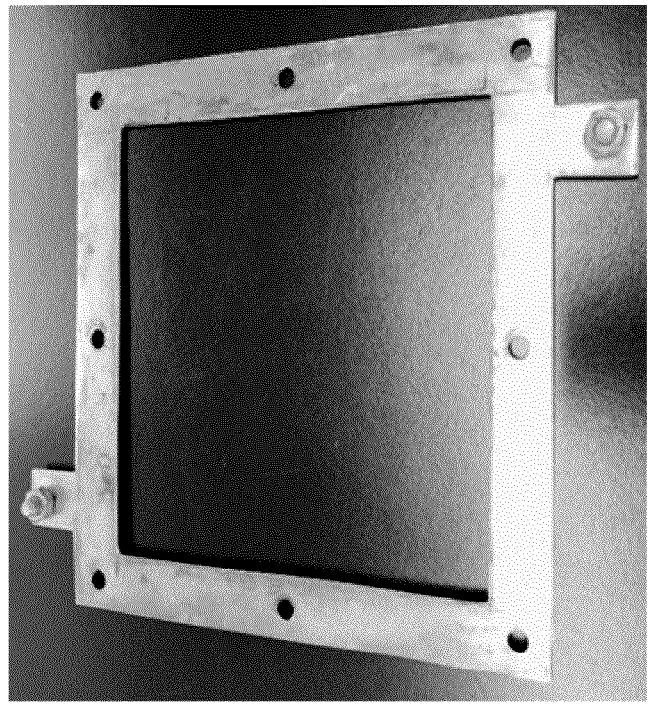
FIG. 19 are pictures of a copper frame above the carbon cloth used for an exemplary study.
Figure 19:
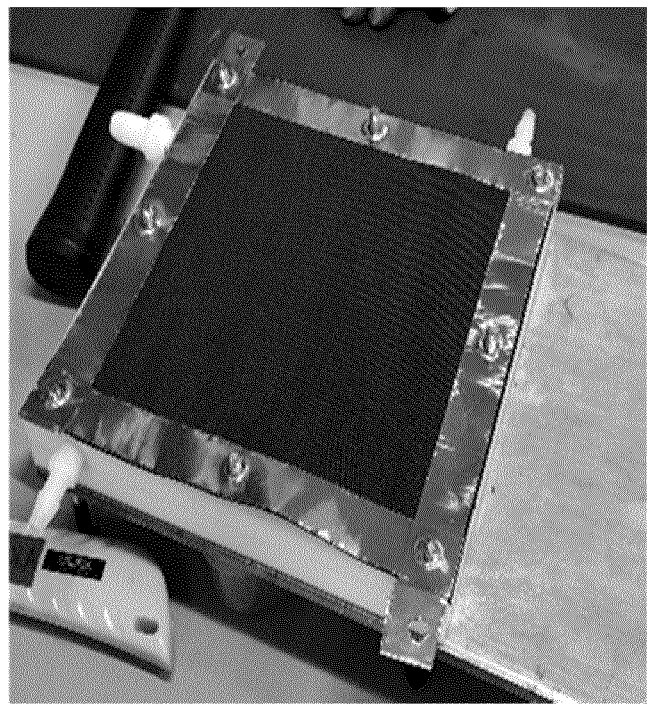

As shown in FIG. 19, the copper frame over the carbon cloth covered by copper tape was used on the gas side to have a good connection.

The addition of the improved copper frame allowed to reduce the electrical resistance and to reach the planned 40 A electrical current and ensured that the electrical connection would no longer risk tearing the copper tape. The spacers that were used in exemplary study 3 were deformed due to the temperature increase in the last minutes of the previous test and could not be used in exemplary study 4. Therefore, exemplary study 4 was performed without the spacers. Centrifugal pumps were used instead of peristaltic pumps to increase the electrolyte flow. The cathode from exemplary study 3 was used in exemplary study 4 after the renewal of the catalytic layer with the brush.

The electric current was gradually increased from 10 A (12.6 V) to 40 A (16.8 V) during the first 90 seconds. Then, the electric current was maintained at 40 A until the end of the test at the 40th minute. The potential slowly decreased from 16.8 V at t=1:30 min to 11.2 V at t=10:00 min. Afterwards, the potential slowly increased to 14 V at the 40th minute.

Figure 20:
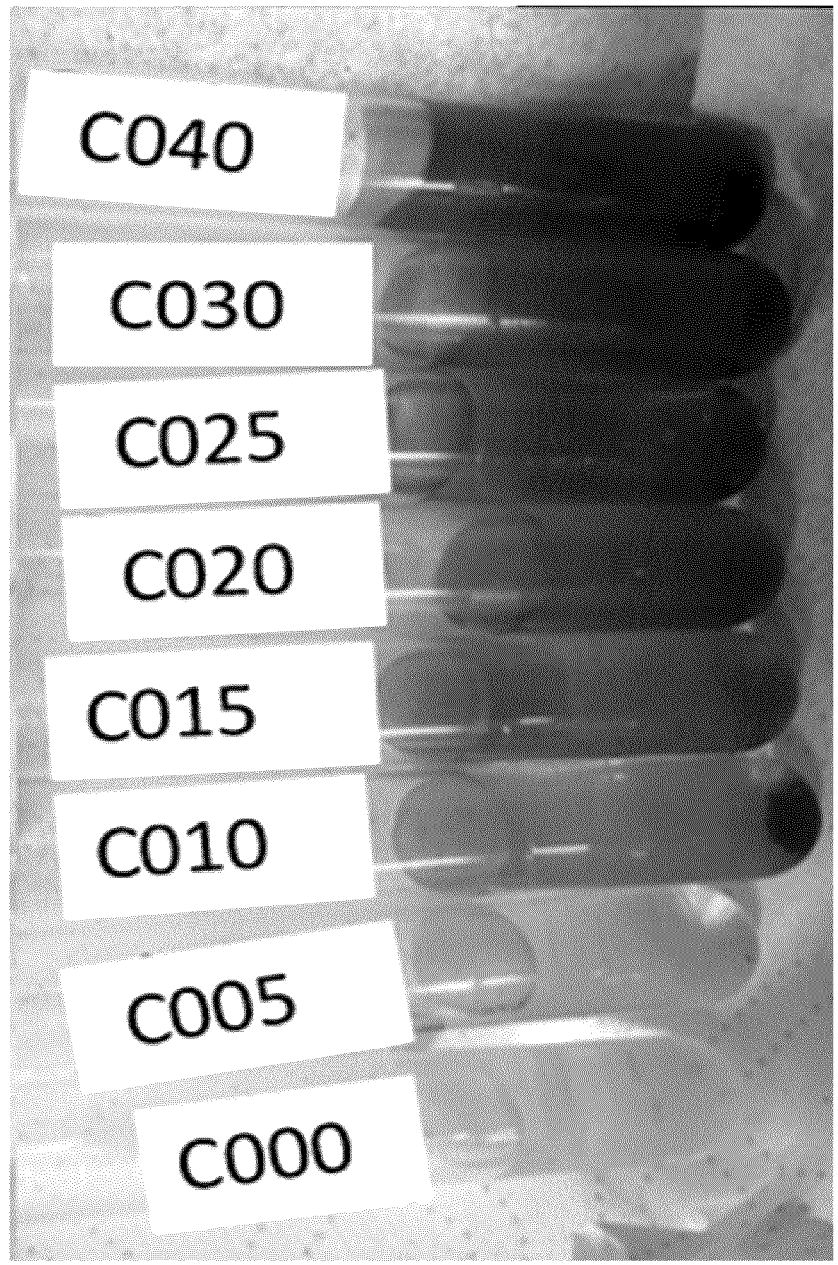
FIG. 20 is a picture of colour changes in the catholyte during the exemplary study.

From the 4th min, the electrolyte in the cathode reservoir started to turn black. This was because of degradation of the cathode during the test. FIG. 20 shows the color changes in the catholyte samples during exemplary study 4.

Figure 21:
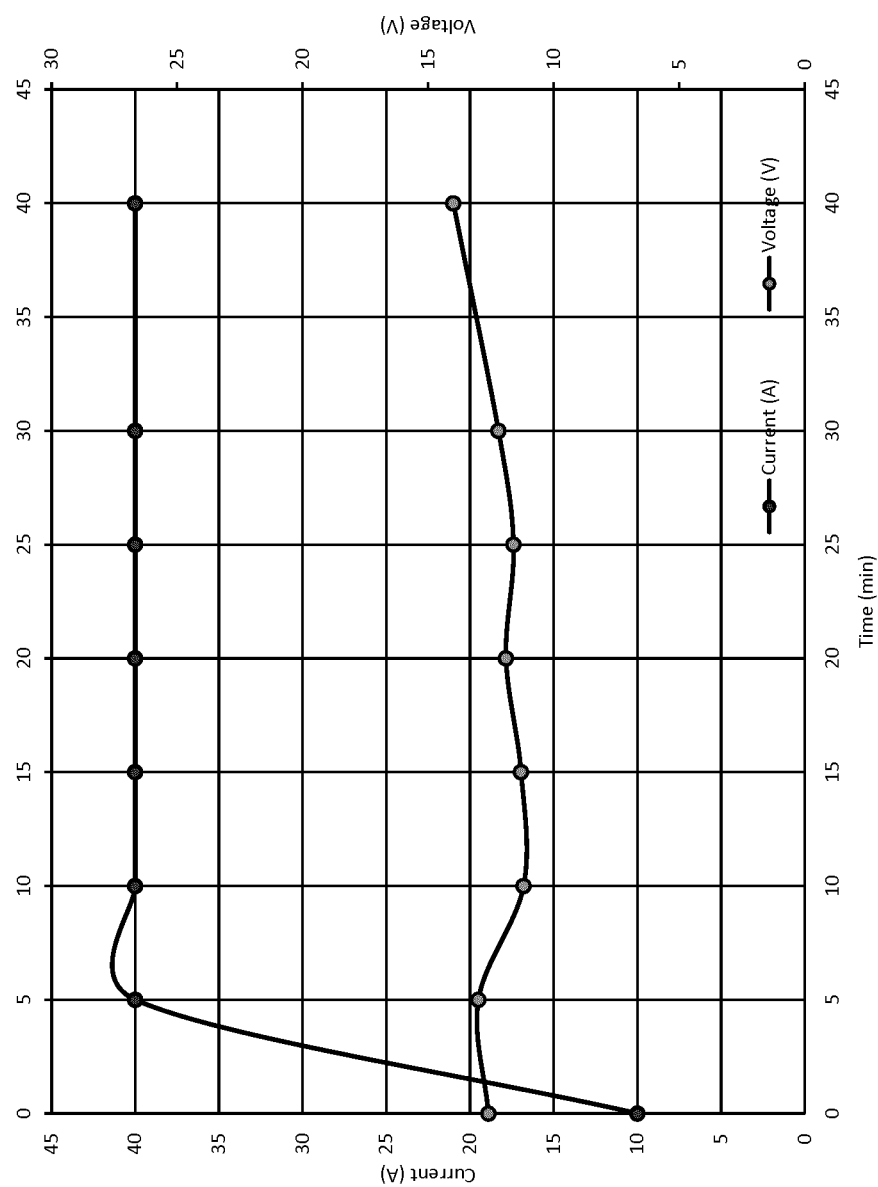
FIG. 21 is a graph showing the evolution of current and voltage during an exemplary study.

FIG. 21 shows the change in current and voltage during exemplary study 4. Although the system voltage had not yet reached its maximum value (20.3 V) within 40 minutes of the test, the test had to be interrupted due to the increase in electrolyte temperature. The catholyte temperature in its reservoir reached 60° C. at the 20th minutes of the test. The initial electrolyte temperature was 21° C.

In this test, the spacers for MEA were not used, increasing the challenge to balance the pressure in the three sections of the cell. This problem refers to the mechanical properties of MEA as its flexibility. Since MEA is flexible, it is stretched by the liquid pressure and this pressure increases in one compartment and decreases in another. As a result, the electrolyte flow in one compartment of the cell was stopped. Adjusting the pressure restored the electrolyte flow.

The volume of catholyte accumulated during the leakage from the gas compartment side in this test was 152 mL.

The results of the HPLC analysis of formate and the electrical yield of conversion of $CO_2$ to formic acid are presented in Table 3. The final calculated yield obtained in this test was 26.1%.

Figure 22:
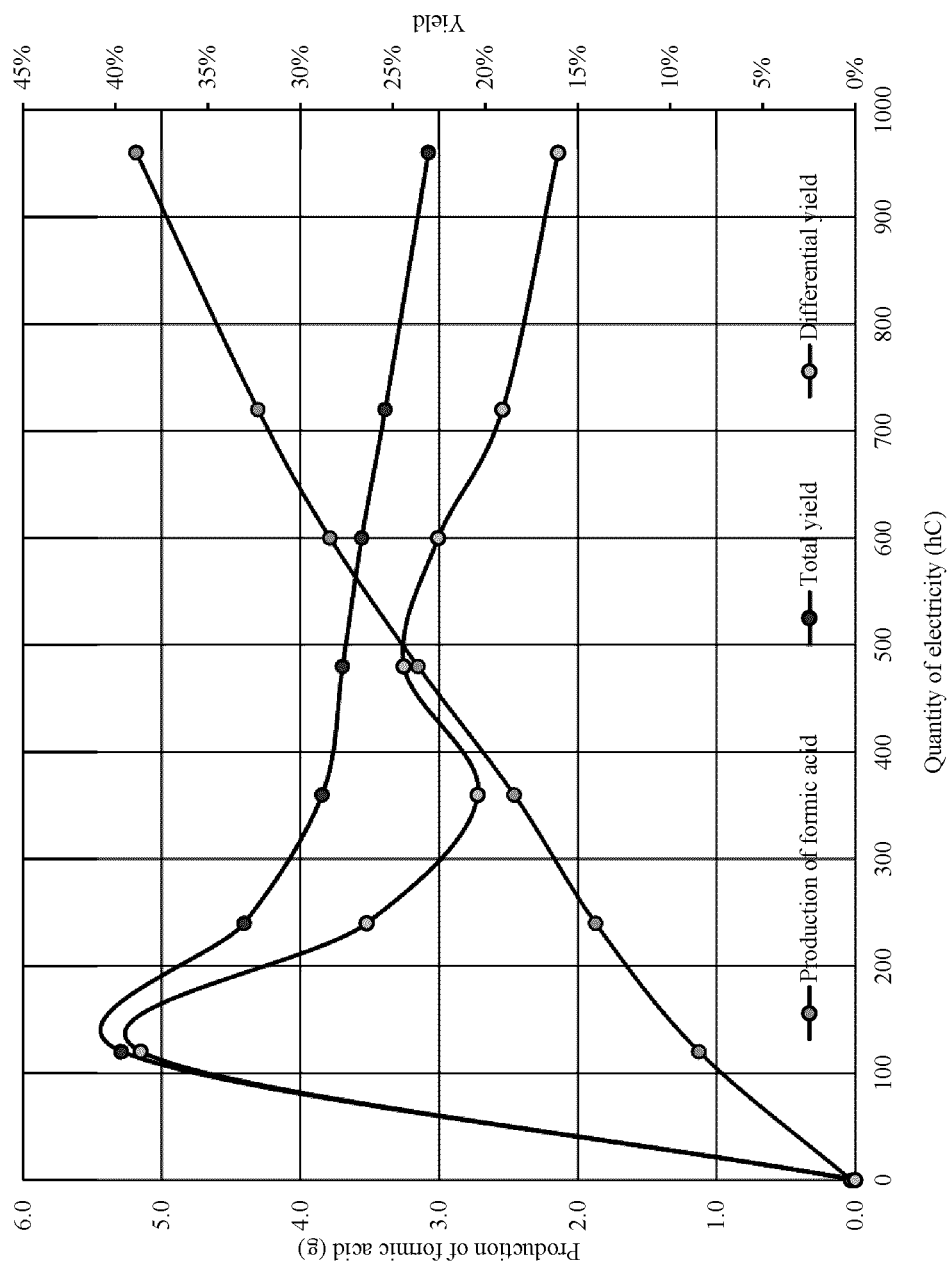
FIG. 22 is a graph showing electrochemical production of formic acid and changes in yield during an exemplary study.

As shown in FIG. 22, the differential yield and overall system yield decreased, despite the constant increase in the amount of formate generated during the experiment.

TABLE 3

Analysis results and current performance test results

| Sample | Concentration of formic acid $CH_2O_2$(mg/L) | Concentration of formate (mg/L) | Volume of electrolyte (mL) | Time (min) | Quantity of electricity (hC) | Current (A) | Voltage (V) | Electric current yield (%) | Differential electric current yield (%) |
|---|---|---|---|---|---|---|---|---|---|
| C000 | 19.8 | 19.3 | 1500 | 0 | 0 | 10.0 | 12.6 | 0.0 | 0.0 |
| C005 | 752 | 735 | 1500 | 5 | 120 | 40.0 | 13.0 | 39.4 | 38.4 |
| C010 | 1248 | 1221 | 1500 | 10 | 240 | 40.0 | 11.2 | 32.7 | 26.0 |
| C015 | 1628 | 1593 | 1510 | 15 | 360 | 40.0 | 11.3 | 28.6 | 20.5 |
| C020 | 2081 | 2036 | 1515 | 20 | 480 | 40.0 | 11.9 | 27.5 | 24.3 |
| C025 | 2497 | 2442 | 1517 | 25 | 600 | 40.0 | 11.6 | 26.5 | 22.2 |
| C030 | 2835 | 2773 | 1519 | 30 | 720 | 40.0 | 12.2 | 25.1 | 18.1 |
| C040 | 3410 | 3335 | 1520 | 40 | 960 | 40.0 | 14.0 | 26.1 | 15.3 |
| Leakage | 5169 | 5056 | 152 | 40 | 960 | n/a | n/a | | n/a |

Exemplary Study 5:

Modifications of the spacers of the electrochemical cells were then studied.

The absence of spacers in the cathode and anode compartments in exemplary study 4 discouraged proper pressure balance between the compartments and control of the catholyte flow rate. The low flow rate could decrease the heat evacuation produced in the cell. The high temperature could cause degradation of the cathode surface. Therefore, it was decided to reproduce exemplary study 4 using the new spacers.

Figure 23:
FIG. 23 is a picture of exemplary pins used to maintain the distance between the spacer and the cathode.

The spacers shown in FIG. 14 are designed and used for this test. They have a higher mechanical resistance than that of the spacers used in exemplary study 3. Also, a part is designed to maintain the distance between the spacer and the cathode (FIG. 23).

The gas flow rate is adjusted at the beginning of the test to 2 L/min. The gas pressure dropped to 1 L/min after 54 min of the test. At this time, the anolyte and catholyte flow rates were 390 mL/min and 570 mL/min, respectively.

Figure 24:
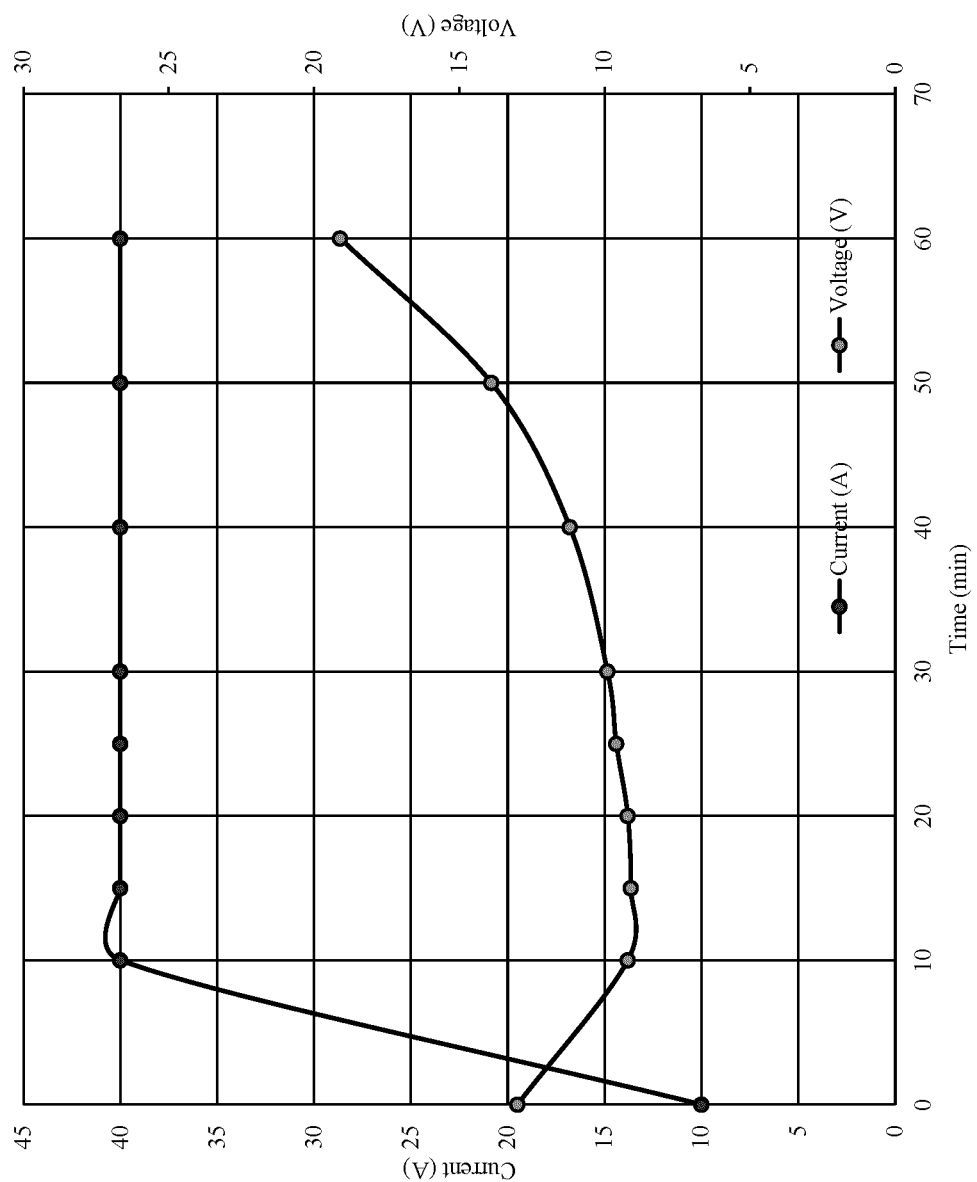
FIG. 24 is a graph showing current and voltage changes over time during the exemplary study.
Figure 25:
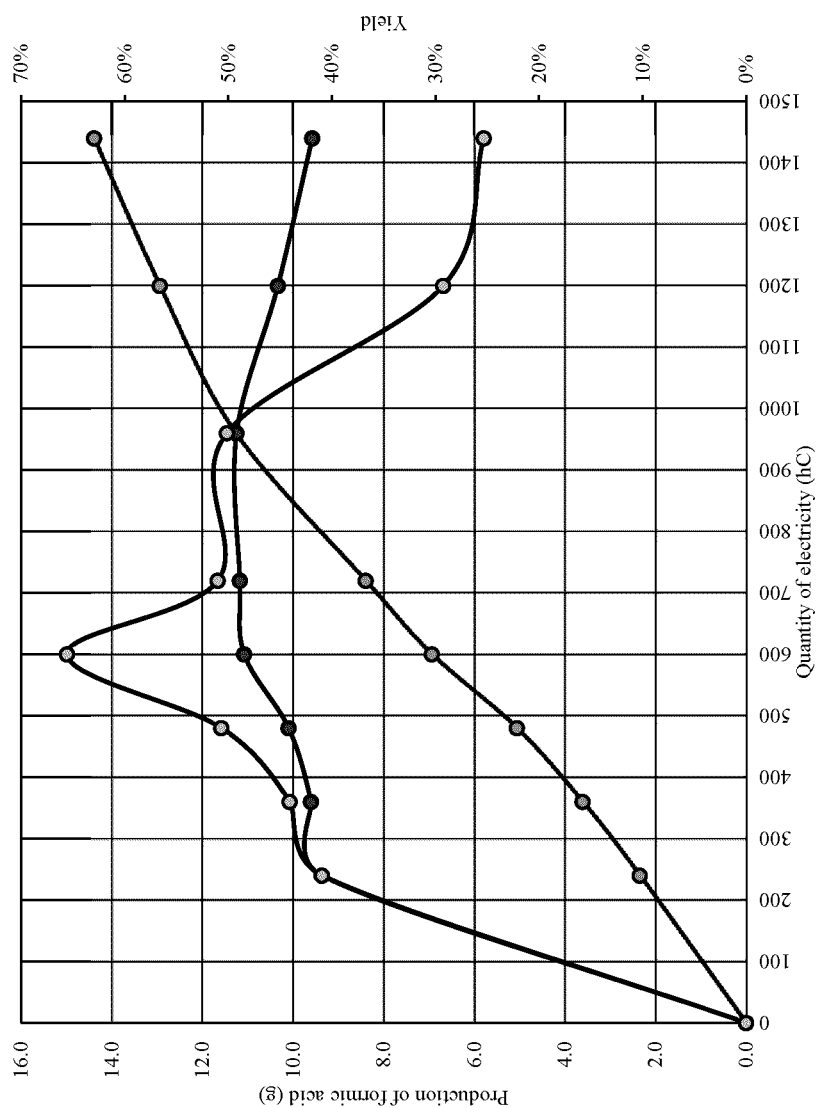
FIG. 25 is a graph showing electrochemical production of formic acid and evolution of yields during the exemplary study.

From the 30th minute onwards, the catholyte becomes increasingly black and as shown in FIG. 24, the evolution of the potential seems to follow (reflect) the state of the cathode.

After 50 minutes of the test, the temperature of the electrolytes reached 65° C. and at the end of the test it is 70° C. (60th minute). Due to the temperature increase and the approach to the rectifier limit point (20.3 V), this test was stopped. The total duration was 60 minutes.

The cell with the modified spacers appears to be easier to control.

The catholyte leakage from the gas side was significantly reduced due to better pressure control applied in this test. The total volume of catholyte drained from the gas compartment was 77 mL.

The results of the HPLC formate analysis and current yield for exemplary study 5 are presented in Table 4. The final calculated current yield for this test was significantly higher than what was obtained in the first two tests since it amounts to 48.8%.

The total formic acid production increased until it reached 14.4 g at the end of the test. It is important to remember that even though it is formate that is initially analyzed, the yields are calculated as if it were formic acid. The incremental running yield of $CO_2$ to formic acid conversion increases to 66% at 25 minutes and subsequently decreases to 25% at the end of the test.

The gas flow rate was adjusted at the beginning of the test to 1.5 L/min. The anolyte and catholyte flow rates were 667 mL/min and 857 mL/min, respectively. This flow rate was fairly constant during the test. At the time of flow adjustment, the pressure in the gas and catholyte sections was 8 kPa and in the anolyte section was 11 kPa. The improved control of cell pressures during this test resulted in a decrease in catholyte leakage from the gas side to 42 mL in two hours (0.35 mL/min). This was the lowest leakage observed in the four tests performed.

The duration of exemplary study 6 was two hours. It was due to the cooling system and maintaining the temperature

TABLE 4 analysis results and current yield for exemplary study 5.

| Sample | Concentration of formic acid $CH_2O_2$ (mg/L) | Concentration of formate (mg/L) | Volume of electrolyte (mL) | Time (min) | Quantity of electricity (hC) | Current (A) | Voltage (V) | Overall current yield (%) | Differential current yield (%) | KOH conversion (%) |
|---|---|---|---|---|---|---|---|---|---|---|
| C000 | 1.8 | 1.8 | 1500 | 0.0 | 0.0 | 10.0 | 13.0 | 0.0 | 0.0 | 0.0 |
| C010 | 1554 | 1520 | 1500 | 10 | 240 | 40.0 | 9.2 | 41.0 | 40.9 | 3.4 |
| C015 | 2381 | 2329 | 1510 | 15 | 360 | 40.0 | 9.1 | 42.0 | 44.1 | 5.2 |
| C020 | 3328 | 3255 | 1515 | 20 | 480 | 40.0 | 9.2 | 44.2 | 50.7 | 7.3 |
| C025 | 4548 | 4448 | 1520 | 25 | 600 | 40.0 | 9.6 | 48.5 | 65.6 | 10.0 |
| C030 | 5487 | 5367 | 1525 | 30 | 720 | 40.0 | 9.9 | 48.9 | 51.0 | 12.1 |
| C040 | 7316 | 7156 | 1530 | 40 | 960 | 40.0 | 11.2 | 49.2 | 50.1 | 16.2 |
| C050 | 8349 | 8166 | 1540 | 50 | 1200 | 40.0 | 13.9 | 45.2 | 29.2 | 18.6 |
| C060 | 9225 | 9023 | 1550 | 60 | 1440 | 40.0 | 19.1 | 48.8 | 25.3 | 20.7 |
| Fuite | 15612 | 15270 | 77.0 | 60 | n/a | n/a | n/a | | n/a | n/a |

Figure 26:
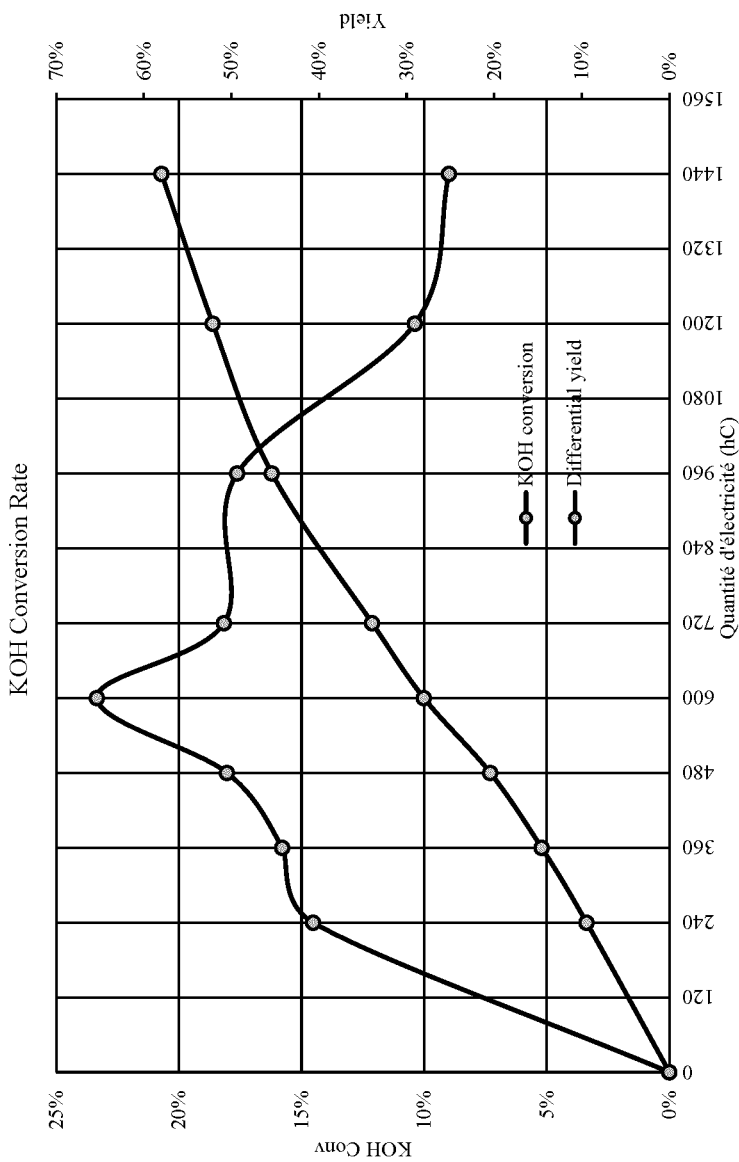
FIG. 26 is a graph showing the change in KOH conversion rate during the exemplary study.

FIG. 26 shows the KOH conversion during the present exemplary study. The KOH conversion rate increases linearly to a maximum value of 21% at the end of the test.

Figure 27:
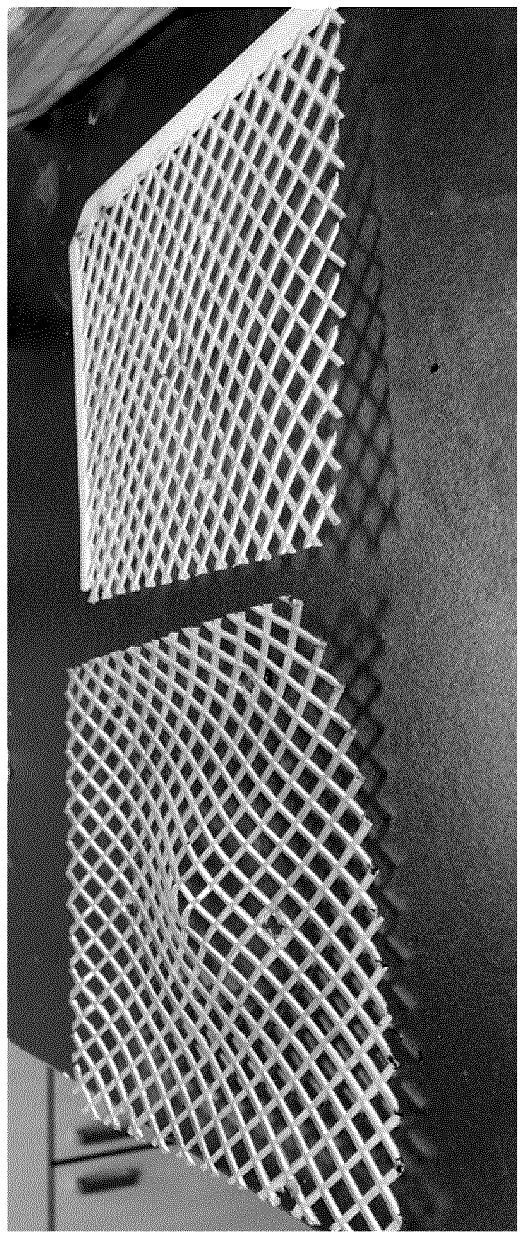
FIG. 27 is a picture of additional exemplary spacers used during the exemplary study.

As shown in FIG. 27, the spacers used in this test were distorted.

Exemplary Study 6:

Controlling the temperature of the electrochemical cell was then studied.

The temperature increase was recorded in the previous tests performed at 40 A. The appearance of black particles on the cathode surface in the catholyte is accompanied by the degradation of the cathode. Therefore, it was decided to replicate exemplary study 5 by adding electrolyte cooling.

Figure 28:
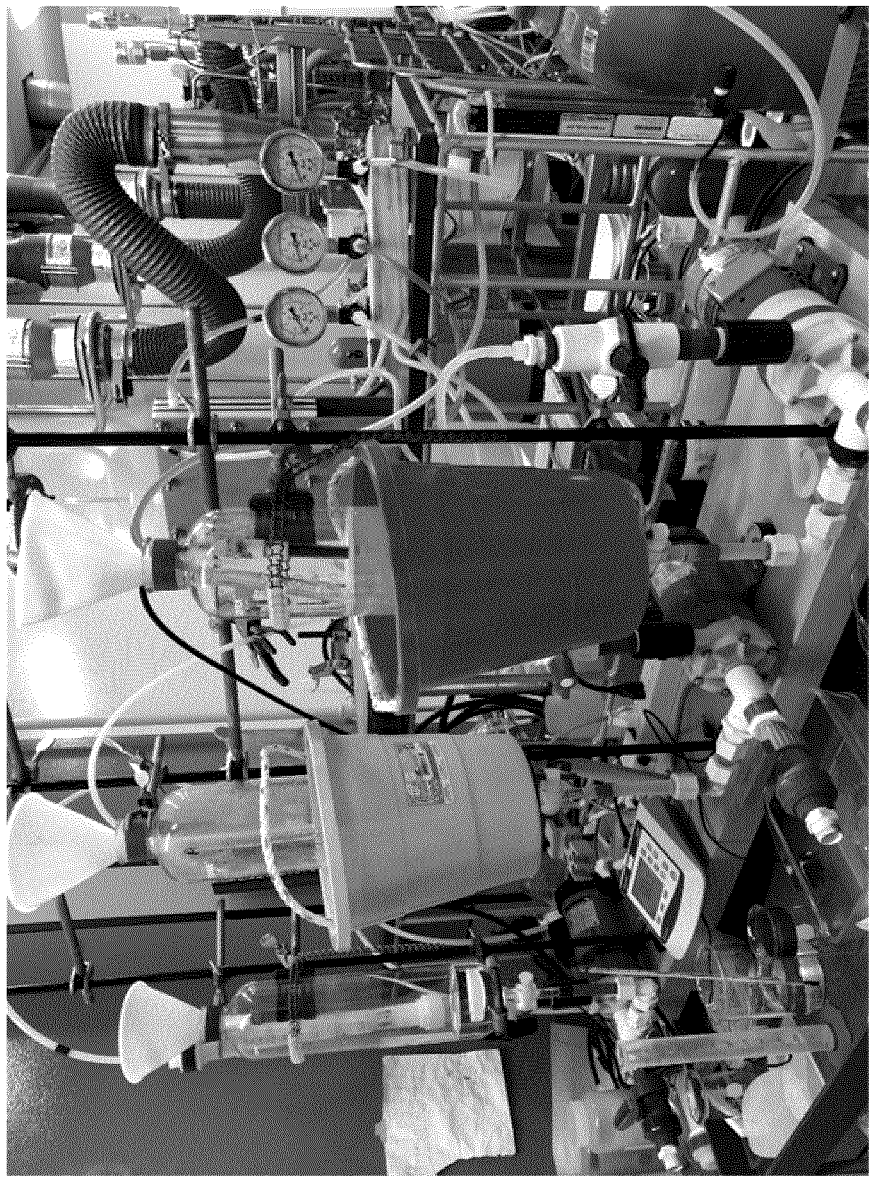
FIG. 28 is a picture of an exemplary manual cooling system used during the exemplary study.

A manual cooling system was made to maintain a relatively low temperature during exemplary study 6. This system consists of two buckets placed around the anolyte and catholyte tanks and filled with water and ice (FIG. 28).

Figure 29:
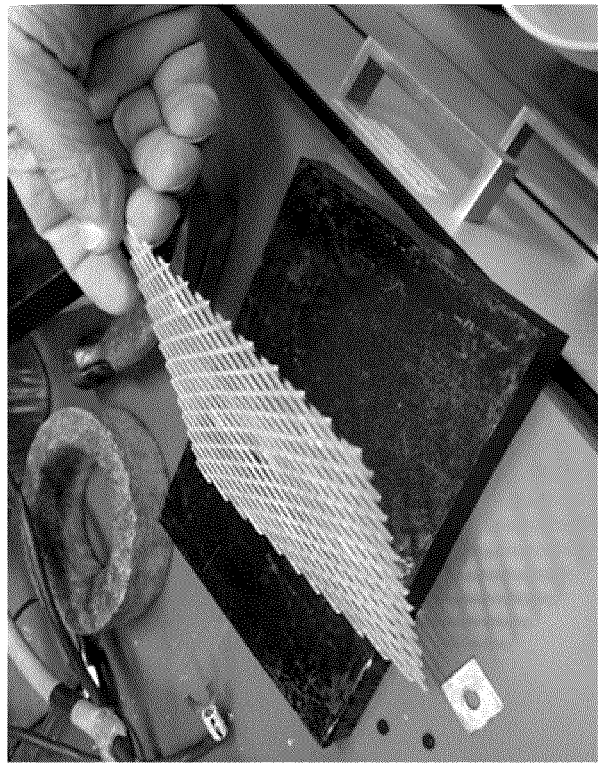
FIG. 29 are pictures showing deformation correction of the supports by placing the supports between two steel plates.
Figure 29:
Figure 30:
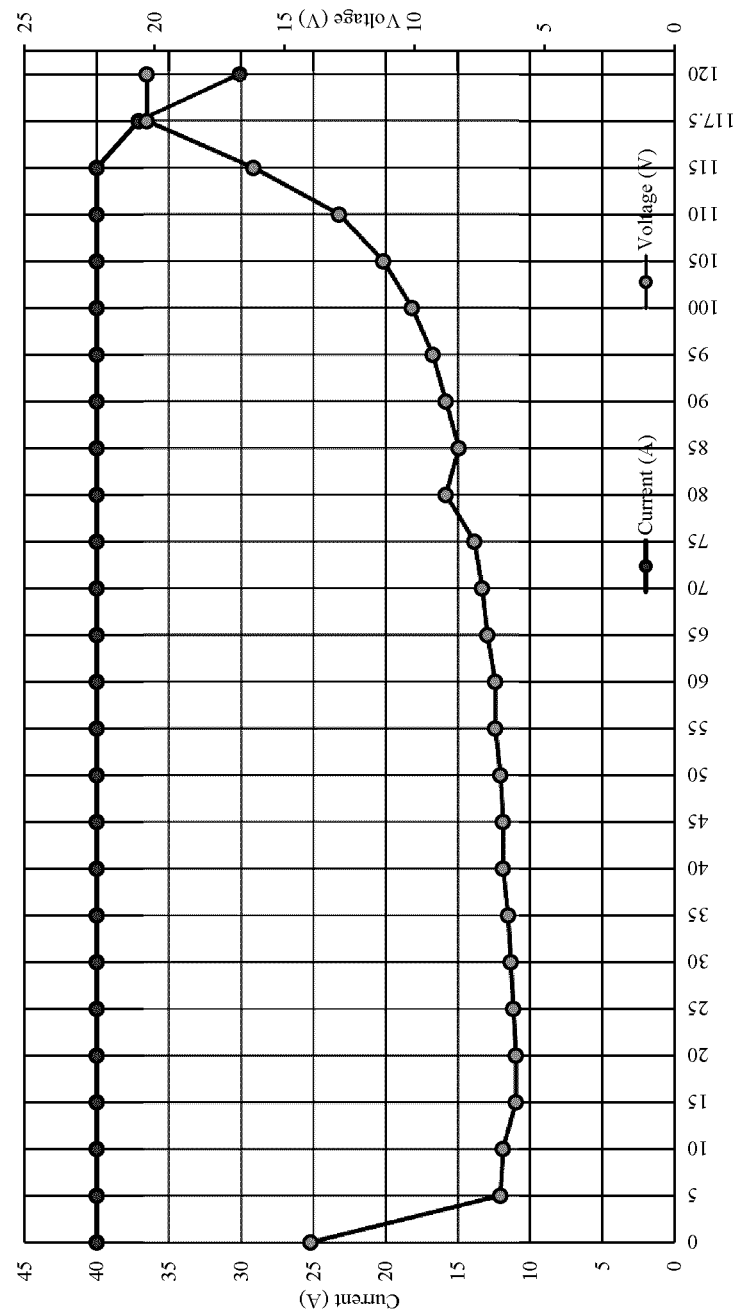
FIG. 30 is a graph showing current and voltage changes over time during the exemplary study.
Figure 31:
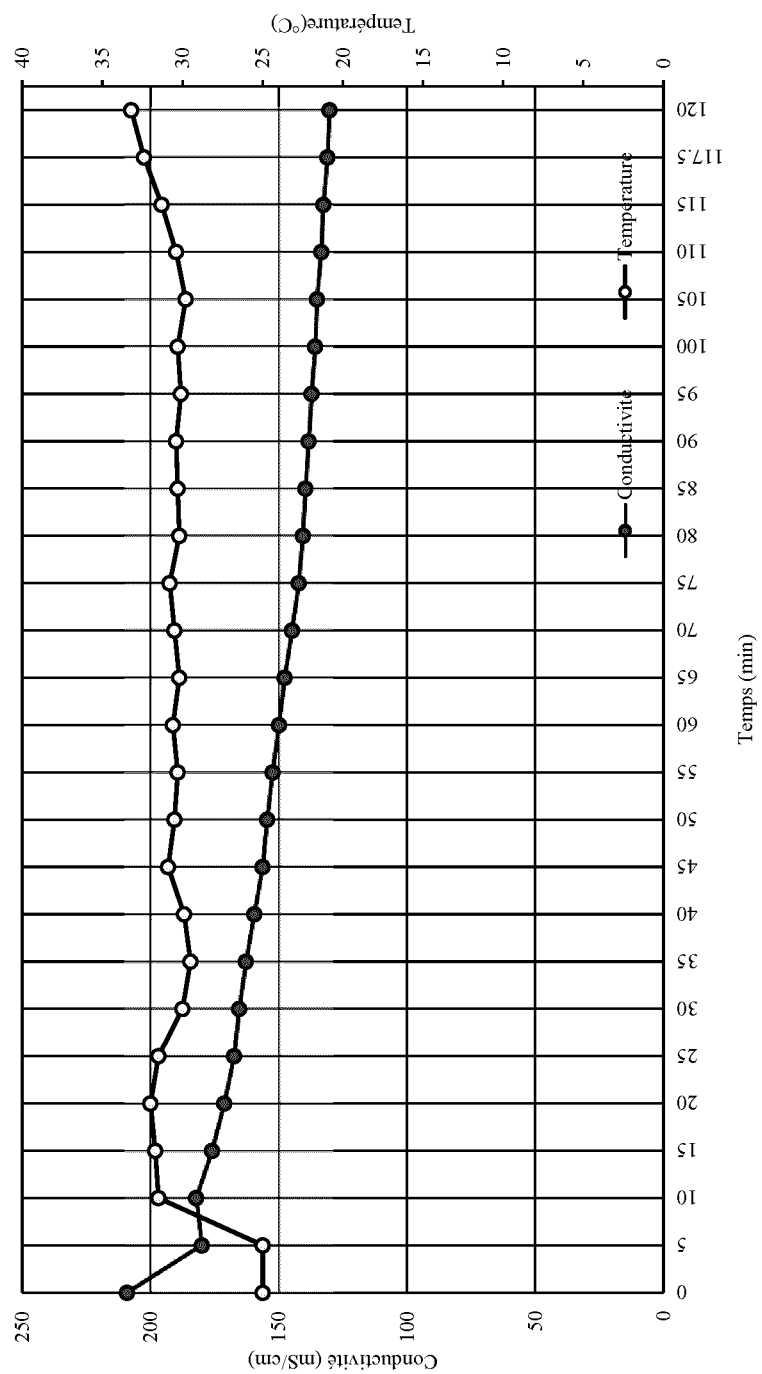
FIG. 31 is a graph showing changes of conductivity and temperature over time during the exemplary study.

The spacers used in the previous test were used in exemplary study 6 after the restoration of the shape. The restoration of the shape was performed by placing the spacers between the two stainless steel plates and then putting them in the oven at 85° C. for 1 hour (FIG. 29).

of the electrolyte around 30° C. FIGS. 30 and 31 show the evolution of current, voltage, temperature and conductivity during two hours of electrolysis.

The system voltage after 90 minutes increased and in the last two minutes of experiment the rectifier limit (20.3 V) was reached. In addition, the conductivity decreased continuously from 209 to 130 mS/cm during the test.

Figure 32:
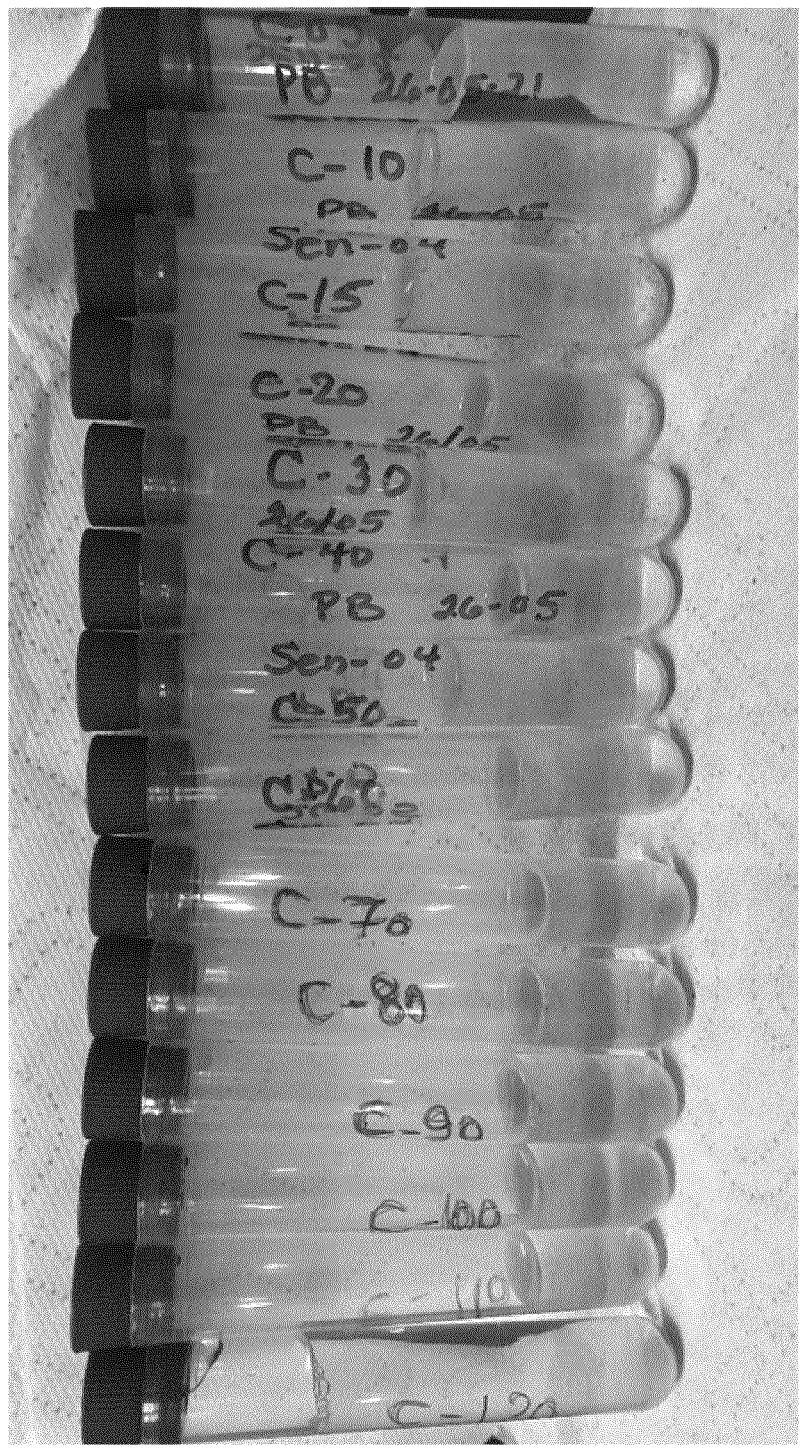
FIG. 32 is a picture showing color changes in the catholyte during the exemplary study.

It is important to know that there was no noticeable degradation of the cathode during exemplary study 6 and it was significantly less than the other tests even though the test lasted 2 hours. FIG. 32 shows the color changes of catholyte during exemplary study 6.

The results of the HPLC formate analysis and the electrical yield of formic acid production for exemplary study 6 are presented in Table 5. The final calculated electrical yield for this test is 82.7%. The total formic acid production at the end of this test was approximately 54 g (98 g potassium formate).

TABLE 5 analysis results and current yield for exemplary study 6.

| Sample | Concentration of formic acid $CH_2O_2$ (mg/L) | Concentration of formate (mg/L) | Volume of electrolyte (mL) | Time (min) | Quantity of electricity (hC) | Currentt (A) | Voltage (V) | Current yield (%) | Differential current yield (%) | KOH conversion (%) |
|---|---|---|---|---|---|---|---|---|---|---|
| Initial electrolyte | 0.0 | 0.0 | 2000 | 0 | 0 | | 14 | 0.0 | 0.0 | 0.0 |
| C005 | 929 | 908 | 2008 | 5 | 120 | 40.0 | 6.7 | 65.2 | 65.2 | 1.0 |
| C010 | 1872 | 1831 | 2015 | 10 | 240 | 40.0 | 6.6 | 65.9 | 66.7 | 2.0 |
| C015 | 2943 | 2878 | 2022 | 15 | 360 | 40.0 | 6.1 | 69.3 | 76.1 | 3.2 |
| C020 | 4080 | 3990 | 2030 | 20 | 480 | 40.0 | 6.1 | 72.3 | 81.4 | 4.5 |
| C030 | 6484 | 6341 | 2045 | 30 | 720 | 40.0 | 6.3 | 77.2 | 86.9 | 7.2 |
| C040 | 8214 | 8034 | 2060 | 40 | 960 | 40.0 | 6.6 | 73.9 | 64.0 | 9.2 |

TABLE 5-continued analysis results and current yield for exemplary study 6.

| Sample | Concentration of formic acid $CH_2O_2$ (mg/L) | Concentration of formate (mg/L) | Volume of electrolyte (mL) | Time (min) | Quantity of electricity (hC) | Currentt (A) | Voltage (V) | Current yield (%) | Differential current yield (%) | KOH conversion (%) |
|---|---|---|---|---|---|---|---|---|---|---|
| C050 | 11060 | 10816 | 2075 | 50 | 1200 | 40.0 | 6.7 | 80.2 | 105.3 | 12.5 |
| C060 | 13261 | 12969 | 2090 | 60 | 1440 | 40.0 | 6.9 | 80.7 | 83.3 | 15.1 |
| C070 | 15496 | 15155 | 2105 | 70 | 1680 | 40.0 | 7.4 | 81.4 | 85.6 | 17.7 |
| C080 | 17565 | 17178 | 2120 | 80 | 1920 | 40.0 | 8.8 | 81.3 | 80.7 | 20.2 |
| C090 | 19389 | 18962 | 2135 | 90 | 2160 | 40.0 | 8.8 | 80.3 | 72.6 | 22.5 |
| C100 | 21196 | 20730 | 2150 | 100 | 2400 | 40.0 | 10.1 | 79.6 | 73.0 | 24.8 |
| C110 | 23082 | 22574 | 2165 | 110 | 2640 | 40.0 | 12.9 | 79.4 | 76.9 | 27.1 |
| C120 | 24829 | 24282 | 2180 | 120 | 2835 | 37.1 | 20.3 | 82.7 | 89.3 | 29.4 |
| Solid without leakage | 5901 | 5771 | 12 | 120 | n/a | n/a | n/a | | n/a | 0.1 |
| Leakage | 40847 | 39948 | 42 | 120 | n/a | n/a | n/a | | n/a | 2.5 |

Figure 33:
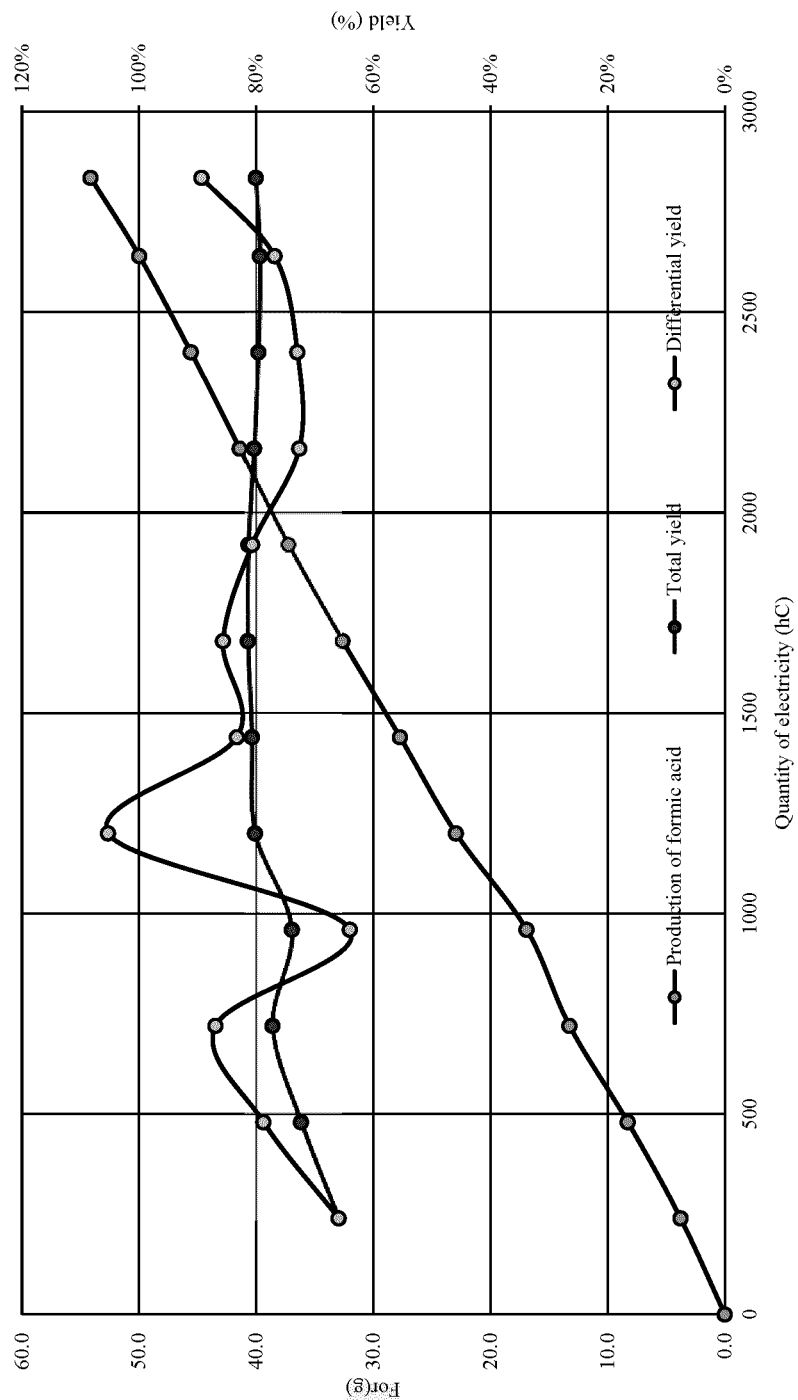
FIG. 33 is a graph showing electrochemical production of formic acid and yield changes during the exemplary study.

FIG. 33 shows that the differential and total yields are around 80% during the test and it can be noticed that formate production increases continuously in an almost linear fashion.

Figure 34:
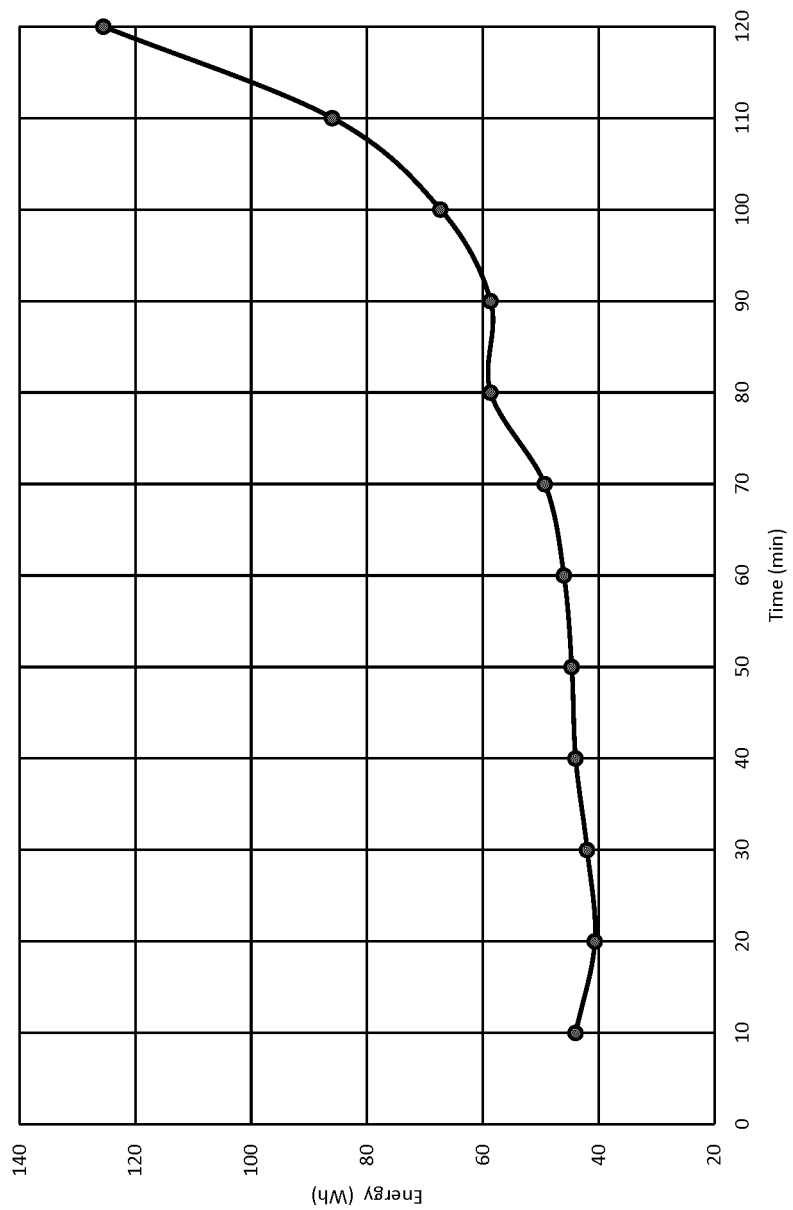
FIG. 34 is a graph showing evolution of the energy consumed during the exemplary study to convert carbon dioxide to formate.

In FIG. 34, the differential energy calculated for the 10 minutes intervals is shown to be relatively stable during the first 60 minutes and starts to increase thereafter.

Exemplary Study 7—Discussions:

The electrochemical technology for the conversion of $CO_2$ to formic acid has been proven in a three-compartment cell with 200 cm² of active surface. Improvements in the cell, such as the spacer, gas and electrolyte pressure control and the reinforcement of the electrical connection (copper frame), contributed to the increase of the electrical efficiency of the $CO_2$ to formic acid conversion up to 49%. The addition of a cooling system allowed to maintain the temperature of the electrolytes around 30° C., to increase the current efficiency to around 83% and to extend the electrochemical treatment time to two hours.

The carbon tissue substrate increased the mechanical strength of the cathode compared to the carbon paper substrate. This cathode reinforcement increased the active surface area in the cell from 5 to 200 cm².

Certain changes to the electrochemical cell may be as follows. Decrease the thickness of each compartment (about 8 mm on the anode side and 6 mm on the cathode side). The overall distance between the cathode and the anode is decreased, which allows to decrease the potential necessary for the current to pass, which has an impact on the energy consumption of the process. Enlarging the tubing may be performed to facilitate the passage of the electrolyte and reduce pressure losses along the circuit in order to have a better control of the operating pressure (by an adjustable outlet valve). For instance, a ⅜" O.D. tubing can be used, instead of ¼" O.D. tubing.

Turbulence promoters may be added that will also act as supports for the membrane. These elements could be manufactured by 3D printing from a plan drawn with an appropriate software. The printing material must be resistant to the base (KOH 2M or more) and must also maintain its mechanical performance at a temperature of at least 60° C. Their design may include many support points on the electrodes that will distribute the pressure differences on both sides of the membrane. It was observed that supports for the membrane were advantageous because the one used was not reinforced and tended to 'swell' on one side or the other depending on the pressure imbalances that inevitably occur during electrolysis. The membrane having a certain elasticity, this causes important variations of internal volume for one or the other of the compartments, which makes the flow rates vary strongly.

Electrolytes with higher concentrations (3 or even 4 mol/L, or 168 or 224 g/L) may be used. Increasing the KOH concentration increases the conductivity but not linearly and it reaches a maximum around 6 mol/L and then decreases. Another parameter is to know up to what concentration formate can be produced. With KOH, there is competition with direct conversion of KOH to $K_2CO_3$ that is present, but it depends on the amount of $CO_2$ that passes directly into the electrolyte. The choice of potassium hydroxide can be justified by its water solubility characteristics of potassium formate. The solubility of KHCO2 is 328 g/100 mL water at 0° C., 361 g/100 mL at 30° C. and 398 g/100 mL at 40° C. (5). Other electrolytes may be considered.

Tests may also be done using NaOH to verify that the current efficiency and conversion rate are maintained. However, the solubility characteristics of sodium formate make $NaHCO_2$ less soluble than potassium formate with values of 43.9 g/100 mL of water at 0° C., 102 g/100 mL at 30° C. and 108 g/100 mL at 40° C. (5).

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

REFERENCES

[1] G. P. Smestad and A. Steinfeld, "Review: Photochemical and thermochemical production of solar fuels from H2O and CO2 using metal oxide catalysts," *Ind. Eng. Chem. Res.*, vol. 51, no. 37, pp. 11828-11840, 2012, doi: 10.1021/ie3007962.

[2] B. Fidalgo and J. Á. Menendez, "Carbon materials as catalysts for decomposition and CO2 reforming of methane: A review," *Cuihua Xuebao/Chinese J. Catal.*, vol. 32, no. 1-2, pp. 207-216, 2011, doi: 10.1016/S1872-2067(10) 60166-0.

[3] B. Ashford and X. Tu, "Non-thermal plasma technology for the conversion of CO2," *Curr. Opin. Green Sustain. Chem.*, vol. 3, pp. 45-49, 2017, doi: 10.1016/j.cogsc.2016.12.001.

[4] C. E. Tornow, M. R. Thorson, S. Ma, A. A. Gewirth, and P. J. A. Kenis, "Nitrogen-based catalysts for the electrochemical reduction of CO2 to CO," *J. Am. Chem. Soc.*, vol. 134, no. 48, pp. 19520-19523, 2012, doi: 10.1021/ja308217w.

[5] J. W. Raebiger et al., "Electrochemical reduction of CO2 to CO catalyzed by a bimetallic palladium complex," *Organometallics*, vol. 25, no. 14, pp. 3345-3351, 2006, doi: 10.1021/om060228g.

[6] S. Rasul, D. H. Anjum, A. Jedidi, Y. Minenkov, L. Cavallo, and K. Takanabe, "A highly selective copper-indium bimetallic electrocatalyst for the electrochemical reduction of aqueous CO2 to CO," *Angew. Chemie-Int. Ed.*, vol. 54, no. 7, pp. 2146-2150, 2015, doi: 10.1002/anie.201410233.

[7] J. Rosen et al., "Mechanistic Insights into the Electrochemical Reduction of CO2 to CO on Nanostructured Ag Surfaces," *ACS Catal.*, vol. 5, no. 7, pp. 4293-4299, 2015, doi: 10.1021/acscatal.5b00840.

[8] V. Talanquer et al., "Molecular Fe Catalyst," *Science (80-.).*, vol. 338, no. October, pp. 90-94, 2012.

[9] M. E. Dry, "The Fischer-Tropsch process: 1950-2000," *Catal. Today*, vol. 71, no. 3-4, pp. 227-241, 2002, doi: 10.1016/S0920-5861(01)00453-9.

[10] Y. Song et al., "High-Selectivity Electrochemical Conversion of CO2 to Ethanol using a Copper Nanoparticle/N-Doped Graphene Electrode," *ChemistrySelect*, vol. 1, no. 19, pp. 6055-6061, 2016, doi: 10.1002/slct.201601169.

[11] D. Ren, N. T. Wong, A. D. Handoko, Y. Huang, and B. S. Yeo, "Mechanistic Insights into the Enhanced Activity and Stability of Agglomerated Cu Nanocrystals for the Electrochemical Reduction of Carbon Dioxide to n-Propanol," *J. Phys. Chem. Lett.*, vol. 7, no. 1, pp. 20-24, 2016, doi: 10.1021/acs.jpclett.5b02554.

[12] C. T. Dinh et al., "CO2 electroreduction to ethylene via hydroxide-mediated copper catalysis at an abrupt interface," *Science (80-.).*, vol. 360, no. 6390, pp. 783-787, 2018, doi: 10.1126/science.aas9100.

[13] D. Kim, C. S. Kley, Y. Li, and P. Yang, "Copper nanoparticle ensembles for selective electroreduction of CO2 to C2-C3 products," *Proc. Natl. Acad. Sci. U.S.A*, vol. 114, no. 40, pp. 10560-10565, 2017, doi: 10.1073/pnas.1711493114.

[14] F. Proietto, B. Schiavo, A. Galia, and O. Scialdone, "Electrochemical conversion of CO2 to HCOOH at tin cathode in a pressurized undivided filter-press cell," *Electrochim. Acta*, vol. 277, pp. 30-40, 2018, doi: 10.1016/j.electacta.2018.04.159.

[15] J. Wang, H. Wang, Z. Han, and J. Han, "Electrodeposited porous Pb electrode with improved electrocatalytic performance for the electroreduction of CO$_2$ to formic acid," *Front. Chem. Sci. Eng.*, vol. 9, no. 1, pp. 57-63, 2015, doi: 10.1007/s11705-014-1444-8.

[16] E. Bertin, S. Garbarino, C. Roy, S. Kazemi, and D. Guay, "Selective electroreduction of CO2 to formate on Bi and oxide-derived Bi films," *J. CO2 Util.*, vol. 19, no. May, pp. 276-283, 2017, doi: 10.1016/j.jcou.2017.04.006.

[17] R. L. Cook, "Electrochemical Reduction of Carbon Dioxide to Methane at High Current Densities," *J. Electrochem. Soc.*, vol. 134, no. 7, p. 1873, 1987, doi: 10.1149/1.2100776.

[18] F. Köleli, T. Röpke, and C. H. Hamann, "Electrochemical impedance spectroscopic investigation of CO2 reduction on polyaniline in methanol," *Electrochim. Acta*, vol. 48, no. 11, pp. 1595-1601, 2003, doi: 10.1016/S0013-4686(03)00076-8.

[19] J. B. Vennekoetter, R. Sengpiel, and M. Wessling, "Beyond the catalyst: How electrode and reactor design determine the product spectrum during electrochemical CO2 reduction," *Chem. Eng. J.*, vol. 364, no. December 2018, pp. 89-101, 2019, doi: 10.1016/j.cej.2019.01.045.

[20] K. Liu, W. A. Smith, and T. Burdyny, "Introductory Guide to Assembling and Operating Gas Diffusion Electrodes for Electrochemical CO2 Reduction," *ACS Energy Lett.*, vol. 4, no. 3, pp. 639-643, 2019, doi: 10.1021/acsenergylett.9b00137.

What is claimed is:

1. An electrochemical cell configured for reducing carbon dioxide that is introduced into the electrochemical cell comprising:
   an anode electrode;
   a cathode electrode comprising a porous support including metal acting as a catalyst;
   an anion exchange membrane, wherein the anion exchange membrane separates an anodic compartment from a cathodic compartment, wherein the cathodic compartment includes a catholyte, the cathode electrode and the carbon dioxide, and the anodic compartment includes an anolyte and the anode electrode;
   a first spacer positioned between the cathode electrode and the anion exchange membrane that is configured to maintain a constant distance between the cathode electrode and the anion exchange membrane and to prevent deformation of the cathode electrode, further comprising pins located between the cathode electrode and the first spacer that contact the cathode electrode to minimize contact between the cathode electrode and the first spacer and to maintain a distance between the cathode electrode and the first spacer; and
   a second spacer positioned between the anode electrode and the anion exchange membrane that is configured to maintain a constant distance between the anode electrode and the anion exchange membrane,
   wherein the anolyte and the catholyte are composed of a liquid electrolyte solution with a concentration between 0.1M-10M, wherein anions of the electrolyte solution are adapted to diffuse from the cathodic compartment to the anodic compartment through the anion exchange membrane,
   wherein the carbon dioxide contacts the cathode electrode and the catalyst converts electrochemically the carbon dioxide into one or more C1 liquid organic by-products and C2 liquid organic by-products and the anions at the catholyte;
   wherein the cathode electrode and the anode electrode are adapted to be electrically connected to a power source through one of:

current collector plates; and a wired connection.

2. The electrochemical cell as defined in claim 1, wherein at least one of:
- the first spacer causes a turbulence in the catholyte to improve the conversion of the carbon dioxide, and
- the second spacer causes a turbulence in the anolyte to improve the conversion of hydroxide ions into oxygen.

3. The electrochemical cell as defined in claim 1, wherein the cathodic compartment further comprises:
- a dry compartment;
- a wet compartment containing the catholyte; and
- a gas diffusion layer separating the dry compartment and the wet compartment, wherein the carbon dioxide is injected into the dry compartment and diffused across the gas diffusion layer into the catholyte of the wet compartment.

4. The electrochemical cell as defined in claim 3, wherein the gas diffusion layer acts as the cathode electrode, the gas diffusion layer including a microporous support with a catalyst deposited thereon, the catalyst composed of metal particles selected from one or more post-transition metals.

5. The electrochemical cell as defined in claim 1, wherein the cathode electrode and the anode electrode are electrically connected through the current collector plates including a cathode plate and an anode plate.

6. The electrochemical cell as defined in claim 1, wherein the cathode electrode and the anode electrode are electrically connected through a wired connection, further comprising a corrosion-resistant plastic support comprising a pattern on a surface of the plastic support for promoting diffusion of carbon dioxide contacting the cathode electrode to the catalyst.

7. The electrochemical cell as defined in claim 6, wherein the corrosion-resistant plastic support is composed of polyethylene or polypropylene.

8. The electrochemical cell as defined in claim 1, wherein the metal coats the porous support.

9. The electrochemical cell as defined in claim 1, wherein the liquid electrolyte solution includes potassium hydroxide.

10. The electrochemical cell as defined in claim 1, wherein the metal acting as a catalyst is selected from tin, lead, indium, bismuth, tin oxide, lead oxide, indium oxide, bismuth oxide and copper.

11. The electrochemical cell as defined in claim 1, wherein the metal acting as a catalyst is doped with one or more of nitrogen and sulfur.

12. The electrochemical cell as defined in claim 1, wherein the anode electrode is composed from:
- iron, nickel, cobalt, magnesium, in one or more of metallic, oxide, hydroxide or (oxy) hydroxide forms; or
- platinum or palladium.

13. The electrochemical cell as defined in claim 12, wherein the anode electrode is composed of a nickel foam.

14. The electrochemical cell as defined in claim 1, wherein the one or more C1 liquid organic by-products and C2 liquid organic by-products includes formate and formic acid.

15. The electrochemical cell as defined in claim 1, wherein the porous support of the cathode electrode is composed of stainless steel coated with anti-corrosive metal, or from graphite.

16. The electrochemical cell as defined in claim 2, wherein the first spacer causes the turbulence in the catholyte to improve the conversion of the carbon dioxide, and the second spacer causes the turbulence in the anolyte to improve the conversion of hydroxide ions into oxygen.

17. A cell stack comprising:
- a plurality of electrochemical cells as defined in claim 1;
- two endplates for compressing the plurality of electrochemical cells, positioned between the two endplates; and
- a carbon dioxide inlet for introducing carbon dioxide into the cell stack.

18. The cell stack as defined in claim 17, further comprising a carbon dioxide outlet for recirculating carbon dioxide into the plurality of electrochemical cells of the cell stack for increasing reaction between the carbon dioxide and the catalyst.

* * * * *